US009697749B2

(12) United States Patent
Eggert et al.

(10) Patent No.: US 9,697,749 B2
(45) Date of Patent: *Jul. 4, 2017

(54) INTERACTIVE EDUCATION SYSTEM WITH PHYSIOLOGICAL MODELING

(71) Applicant: Gaumard Scientific Company, Inc., Miami, FL (US)

(72) Inventors: John S. Eggert, Miami, FL (US); Ning Jiang, Coral Gables, FL (US); Maria Christina Ramirez, Miami, FL (US)

(73) Assignee: GAUMARD SCIENTIFIC COMPANY, INC., Miami, FL (US)

( * ) Notice: Subject to any disclaimer, the term of this patent is extended or adjusted under 35 U.S.C. 154(b) by 183 days.

This patent is subject to a terminal disclaimer.

(21) Appl. No.: 14/291,721

(22) Filed: May 30, 2014

(65) Prior Publication Data
US 2014/0272874 A1    Sep. 18, 2014

Related U.S. Application Data

(63) Continuation of application No. 12/708,682, filed on Feb. 19, 2010, now Pat. No. 8,740,624.

(51) Int. Cl.
G09B 23/00 (2006.01)
G09B 23/30 (2006.01)
G09B 23/28 (2006.01)

(52) U.S. Cl.
CPC ......... *G09B 23/303* (2013.01); *G09B 23/281* (2013.01); *G09B 23/288* (2013.01); *G09B 23/30* (2013.01)

(58) Field of Classification Search
CPC ..... G09B 23/281; G09B 23/303; G09B 23/34
See application file for complete search history.

(56) References Cited

U.S. PATENT DOCUMENTS

| 4,134,218 A | 1/1979 | Adams et al. |
| 4,351,344 A | 9/1982 | Stenzler |

(Continued)

FOREIGN PATENT DOCUMENTS

| JP | 2008/150447 A | 7/2008 |
| KR | 10/0301711 B1 | 3/2003 |

(Continued)

OTHER PUBLICATIONS

Japanese Patent Office, "Office Action" for Application No. 2012-554070, mailed Mar. 10, 2015, 4 pages.

(Continued)

*Primary Examiner* — Peter Egloff
(74) *Attorney, Agent, or Firm* — Haynes and Boone LLP

(57) ABSTRACT

Patient simulator systems for teaching patient care are provided. In some instances, the patient simulator systems include a patient body comprising one or more simulated body portions. Generally, the patient simulator systems of the present disclosure provide physiological modeling. In one embodiment, the patient simulator includes a maternal simulator comprising a maternal circulatory model, a maternal cardiac ischemia model, and a maternal respiratory model and a fetal simulator comprising a fetal circulatory model, a fetal cardiac ischemia model, and a fetal central nervous system model. A controller in communication with the maternal and fetal simulators coordinates parameters of the maternal circulatory model, the maternal cardiac ischemia model, the maternal respiratory model, the fetal circulatory model, the fetal cardiac ischemia model, and the fetal central nervous system model to simulate physiological characteristics of a natural mother and fetus. Methods of utilizing the patient simulator systems are also provided.

38 Claims, 6 Drawing Sheets

(56) References Cited

U.S. PATENT DOCUMENTS

| | | |
|---|---|---|
| 5,853,292 A | 12/1998 | Eggert et al. |
| 5,900,438 A | 5/1999 | Miyoshi et al. |
| 6,062,866 A | 5/2000 | Prom |
| 6,068,602 A | 5/2000 | Tham et al. |
| 6,193,519 B1 | 2/2001 | Eggert et al. |
| 6,443,735 B1 | 9/2002 | Eggert et al. |
| 6,485,308 B1 | 11/2002 | Goldstein |
| 6,503,087 B1 | 1/2003 | Eggert et al. |
| 6,527,558 B1 | 3/2003 | Eggert et al. |
| 6,568,941 B1 | 5/2003 | Goldstein |
| 6,758,676 B2 | 7/2004 | Eggert et al. |
| 7,114,954 B2 | 10/2006 | Eggert et al. |
| 7,632,100 B2 | 12/2009 | Allen et al. |
| 7,976,312 B2 | 7/2011 | Eggert et al. |
| 7,976,313 B2 | 7/2011 | Eggert et al. |
| 8,016,598 B2 | 9/2011 | Eggert et al. |
| 8,142,358 B2 | 3/2012 | Pedrizzetti et al. |
| 8,740,624 B2 * | 6/2014 | Eggert ................ G09B 23/288 434/267 |
| 2002/0076680 A1 | 6/2002 | Logan |
| 2002/0076681 A1 | 6/2002 | Leight et al. |
| 2005/0214727 A1 | 9/2005 | Stoianovici et al. |
| 2006/0166176 A1 * | 7/2006 | Lakin ................ G06F 19/3437 434/262 |
| 2007/0087314 A1 | 4/2007 | Gomo |
| 2007/0172804 A1 | 7/2007 | Allen et al. |
| 2007/0218442 A1 | 9/2007 | Dupuis et al. |
| 2008/0076099 A1 | 3/2008 | Sarvazyan et al. |
| 2008/0131855 A1 | 6/2008 | Eggert et al. |
| 2008/0138780 A1 * | 6/2008 | Eggert ................ G06F 19/3437 434/266 |
| 2009/0148822 A1 | 6/2009 | Eggert et al. |
| 2011/0207102 A1 | 8/2011 | Trotta et al. |
| 2011/0207103 A1 | 8/2011 | Trotta et al. |
| 2011/0207104 A1 | 8/2011 | Trotta et al. |

FOREIGN PATENT DOCUMENTS

| | | |
|---|---|---|
| WO | WO 2008/021720 A2 | 2/2008 |
| WO | WO 2009/039210 A9 | 3/2009 |
| WO | WO 2009/088304 A1 | 7/2009 |

OTHER PUBLICATIONS

Trotta et al., U.S. Appl. No. 13/031,116, filed Feb. 18, 2011.
WIPO International Searching Authority, Search Report for PCT/US2011/025055, Feb. 16, 2011, 3 pages.
WIPO International Searching Authority, Search Report for PCT/US2011/025513, Feb. 18, 2011, 4 pages.
WIPO International Searching Authority, Search Report for PCT/US2011/025515, Feb. 18, 2011, 3 pages.
WIPO International Searching Authority, Search Report for PCT/US2011/025519, Feb. 18, 2011, 5 pages.
Eggert et al., U.S. Appl. No. 11/952,559, filed Dec. 7, 2007, 154 pages.
Eggert et al., U.S. Appl. No. 11/952,606, filed Dec. 7, 2007, 154 pages.
Eggert et al., U.S. Appl. No. 11/952,636, filed Dec. 7, 2007, 155 pages.
Eggert et al., U.S. Appl. No. 11/952,669, filed Dec. 7, 2007, 154 pages.
Eggert et al., U.S. Appl. No. 11/952,698, filed Dec. 7, 2007, 154 pages.

* cited by examiner

INTERACTIVE EDUCATION SYSTEM WITH PHYSIOLOGICAL MODELING

BACKGROUND

The present disclosure relates generally to interactive education systems for teaching patient care. While it is desirable to train medical personnel in patient care protocols before allowing contact with real patients, textbooks and flash cards lack the important benefits to students that can be attained from hands-on practice. On the other hand, allowing inexperienced students to perform medical procedures on actual patients that would allow for the hands-on practice cannot be considered a viable alternative because of the inherent risk to the patient. Because of these factors patient care education has often been taught using medical instruments to perform patient care activity on a simulator, such as a manikin. Examples of such simulators include those disclosed in U.S. patent application Ser. No. 11/952,559, U.S. patent application Ser. No. 11/952,606, U.S. patent application Ser. No. 11/952,636, U.S. patent application Ser. No. 11/952,669, U.S. patent application Ser. No. 11/952,698, U.S. Pat. No. 7,114,954, U.S. Pat. No. 6,758,676, U.S. Pat. No. 6,503,087, U.S. Pat. No. 6,527,558, U.S. Pat. No. 6,443,735, U.S. Pat. No. 6,193,519, and U.S. Pat. No. 5,853,292, each herein incorporated by reference in its entirety.

While these simulators have been adequate in many respects, they have not been adequate in all respects. Therefore, what is needed is an interactive education system for use in conducting patient care training sessions that is even more realistic and/or includes additional simulated features.

SUMMARY

The present disclosure provides interactive education systems, apparatus, components, and methods for teaching patient care that include physiological modeling.

In one embodiment, a system for teaching patient care is provided. The system includes a maternal simulator and a fetal simulator. The maternal simulator includes a maternal circulatory model, a maternal cardiac ischemia model, and a maternal respiratory model, while the fetal simulator includes a fetal circulatory model, a fetal cardiac ischemia model, and a fetal central nervous system model. The fetal simulator is in communication with the maternal simulator. Further, a controller is in communication with each of the maternal simulator and the fetal simulator. The controller coordinates parameters of the maternal circulatory model, the maternal cardiac ischemia model, the maternal respiratory model, the fetal circulatory model, the fetal cardiac ischemia model, and the fetal central nervous system model to simulate physiological characteristics of a natural mother and fetus.

In some instances, the maternal circulatory model is a multi-compartment circulatory model that includes a simulated uterus. The maternal circulatory model further includes a simulated right atrium, a simulated right ventricle, a simulated left atrium, and a simulated left ventricle in some embodiments. The maternal circulatory model includes various combinations of the anatomical features of the natural circulatory system. Generally, any combination of the anatomical features of the natural circulatory system may be included in the maternal circulatory model. As described below, in some instances the maternal circulatory model is an 19-compartment circulatory model. In some instances, the maternal ischemia model includes a simulated aorta and a simulated coronary artery. The maternal respiratory model includes a simulated right lung and a simulated left lung, in some embodiments. The respiratory model further includes dead space (e.g., airway and alveoli) in some instances. In some instances, the maternal simulator further includes a maternal cardiac dipole model. In that regard, the maternal cardiac dipole model generates 12-lead ECG waves for four heart chambers of the maternal circulatory model in some instances. The maternal cardiac dipole model further generates a contraction profile that includes timing and contractility of each of the four heart chambers during a contraction, in some embodiments.

In some instances, the fetal circulatory model is a multi-compartment circulatory model that includes a simulated placenta. The fetal circulatory model further includes a simulated right atrium, a simulated right ventricle, a simulated left atrium, and a simulated left ventricle in some embodiments. The maternal circulatory model includes various combinations of the anatomical features of the natural circulatory system. Generally, any combination of the anatomical features of the natural circulatory system may be included in the fetal circulatory model. As described below, in some instances the fetal circulatory model is an 18-compartment circulatory model. In some instances, the fetal ischemia model includes a simulated aorta and a simulated coronary artery. In some instances, the maternal circulatory model and the fetal circulatory model are connected to one another. For example, in some embodiments the maternal circulatory model includes a simulated uterus and the fetal circulatory model includes a simulated placenta such that the simulated placenta is connected to the simulated uterus. Further, in some instances the maternal simulator includes a mechanism configured to translate and rotate the fetal simulator relative to maternal simulator to simulate a birth.

In some embodiments, the controller includes a processor programmed to coordinate parameters of the maternal circulatory model, the maternal cardiac ischemia model, the maternal respiratory model, the fetal circulatory model, the fetal cardiac ischemia model, and the fetal central nervous system model based on a desired physiological scenario. In that regard, the controller is positioned remote from the maternal simulator in some instances. For example, the controller is positioned within a computing device that is in communication with the maternal simulator and/or the fetal simulator in some embodiments. The desired physiological scenario is selectable by a user through a user interface in some instances. The desired physiological scenario is selected from scenarios such as maternal bleeding, maternal uterine rupture, maternal apnea, maternal VFib, maternal VTach, fetal bleeding, fetal cord compression, and/or other physiological scenarios.

In some embodiments, the system further includes a neonatal simulator for use in post birth situations. The neonatal simulator includes a neonatal circulatory model, a neonatal cardiac ischemia model, and a neonatal respiratory model. In some instances, the controller is in communication with the neonatal simulator and configured to coordinate parameters of the neonatal circulatory model, the neonatal cardiac ischemia model, and the neonatal respiratory model to simulate physiological characteristics of a newborn. In that regard, the parameters of the neonatal circulatory model and the neonatal cardiac ischemia model are at least partially based upon the parameters of the fetal circulatory model and the fetal cardiac ischemia model in some instances.

In another embodiment, an apparatus with physiological modeling is provided. In that regard, the apparatus includes a patient simulator having a patient body comprising one or more simulated body portions, including at least a simulated circulatory system and a simulated respiratory system. The apparatus also includes a controller in communication with the patient simulator. The controller is configured to coordinate parameters of the simulated circulatory system and the simulated respiratory system to simulate physiological characteristics associated with a desired physiological scenario. The controller determines the parameters of the simulated circulatory system and the simulated respiratory system for the desired physiological scenario based on a circulatory model and a respiratory model for the patient simulator.

In some instances, the circulatory model is a multi-compartment circulatory model including a simulated right atrium, a simulated right ventricle, a simulated left atrium, and a simulated left ventricle. The circulatory model includes various combinations of the anatomical features of the natural circulatory system. Generally, any combination of the anatomical features of the natural circulatory system may be included in the circulatory model. As described below, in some instances the circulatory model is a 18-compartment circulatory model. In some instances, the patient simulator is a maternal simulator and the circulatory model further includes a simulated uterus. The respiratory model includes a simulated right lung and a simulated left lung. In some instances, the respiratory model further includes dead space. In some embodiments, the controller determines the parameters of the simulated circulatory system for the desired physiological scenario at least partially based on an ischemia model for the patient simulator, where the ischemia model includes a simulated aorta and a simulated coronary artery. In some embodiments, the patient simulator is configured to generate 12-lead ECG waves and contraction profiles for a heart of the simulated circulatory system. In that regard, the controller controls the 12-lead ECG waves and contraction profiles generated by the patient simulator. The controller determines values for the 12-lead ECG waves and the contraction profiles based on a cardiac dipole model in some embodiments.

In some instances, the patient body is sized and shaped to simulate a newborn. In that regard, the parameters of the simulated circulatory system are at least partially based on physiological characteristics of a fetus associated with the newborn in some instances. For example, in some embodiments, the fetus associated with the newborn is the patient simulator prior to a birthing simulation, and the newborn is the patient simulator after the birthing simulation.

In another embodiment, methods of teaching patient care are provided. In one embodiment, the method includes providing a maternal simulator comprising a simulated maternal circulatory system and a simulated maternal respiratory system; providing a fetal simulator for use with the maternal simulator, the fetal simulator comprising a simulated fetal circulatory system; controlling one or more parameters of the simulated maternal circulatory system and simulated maternal respiratory system based on a maternal circulatory model, a maternal cardiac ischemia model, and a maternal respiratory model; and controlling one or more parameters of the simulated fetal circulatory system based on a fetal circulatory model, a fetal cardiac ischemia model, and a fetal central nervous system model. The parameters of the simulated maternal circulatory system, the simulated maternal respiratory system, and the simulated fetal circulatory system are coordinated to simulate physiological characteristics of a natural mother and fetus for a desired physiological scenario.

In some instances, the controlling of the one or more parameters of the simulated maternal circulatory system is further based on a maternal cardiac dipole model. The one or more controlled parameters of the simulated maternal circulatory system include one or more of a maternal blood pressure, a maternal heart rate, a maternal cardiac rhythm, and/or other parameters. The one or more controlled parameters of the simulated fetal circulatory system include a fetal heart rate and/or other parameters.

BRIEF DESCRIPTION OF THE DRAWINGS

Other features and advantages of the present disclosure will become apparent in the following detailed description of illustrative embodiments with reference to the accompanying of drawings, of which.

DETAILED DESCRIPTION

Figure 1:
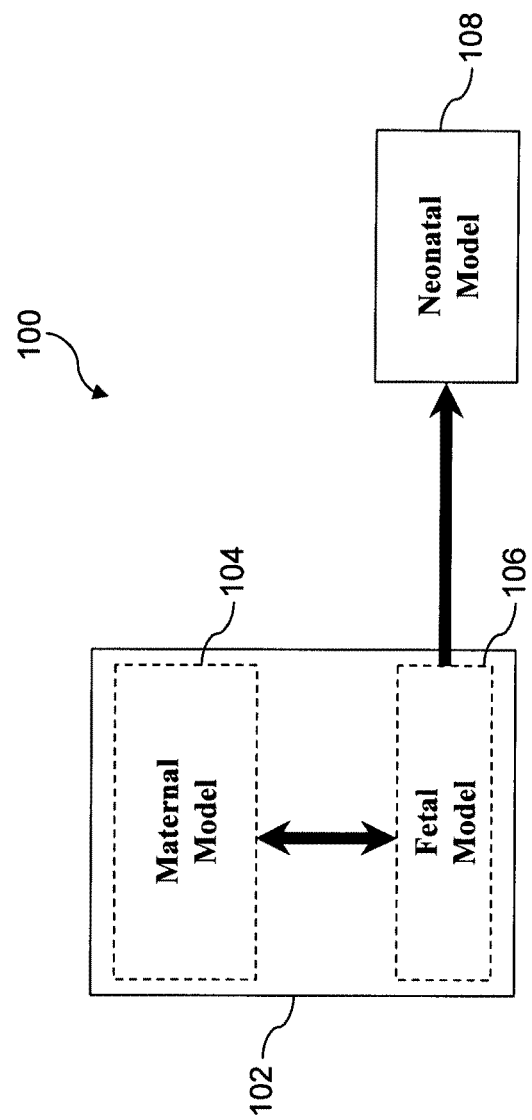
FIG. 1 is a diagrammatic schematic view of an arrangement incorporating aspects of the present disclosure.

For the purposes of promoting an understanding of the principles of the present disclosure, reference will now be made to the embodiments illustrated in the drawings, and specific language will be used to describe the same. It will nevertheless be understood that no limitation of the scope of the disclosure is intended. Any alterations and further modifications in the described devices, instruments, methods, and any further application of the principles of the disclosure as described herein are contemplated as would normally occur to one skilled in the art to which the disclosure relates. In particular, it is fully contemplated that the features, components, and/or steps described with respect to one embodiment may be combined with the features, components, and/or steps described with respect to other embodiments of the present disclosure.

One of the aims of healthcare simulation is to establish a teaching environment that closely mimics key clinical cases in a reproducible manner. The introduction of high fidelity tetherless simulators, such as those available from Gaumard Scientific Company, Inc., over the past few years has proven to be a significant advance in creating realistic teaching environments. The concepts of the present disclosure take the simulators to another level of realism by introducing physiological modeling into the simulators. In particular, the present disclosure provides physiological systems that are modeled on concurrent differential equations to provide autonomous or semi autonomous control of the simulators' vital signs. In that regard, in many instances the physiological modeling is executed without the need for substantial input or direction from the facilitator or user in control of the simulator. Rather, in many instances, the facilitator or user in control of the simulator need only actuate a particular scenario through a user-interface (e.g., clicking on a simulated button for the particular physiological scenario on a display associated with a computing device) and the physiological models will automatically control the vital signs of the simulators based on the selected scenario and/or the user's interaction with the simulators (e.g., treatments applied to the simulator(s)). In this manner, the present disclosure provides improved medical simulation teaching environments. In some instances, the physiological modeling of the present disclosure is particularly focused on the physiological interaction between a mother and a fetus and, subsequently, the newborn. As the health of the mother, fetus, and newborn are interconnected, a more realistic simulation teaching environment will simulate these interactions in a realistic manner. The present disclosure provides such realistic interaction between the physiological characteristics of the mother and fetus and, in some instances, a corresponding newborn by controlling the physiological characteristics of each of the simulators based on physiological models relating the physiological characteristics of the simulators to one another.

Referring to FIG. 1, shown therein is an arrangement 100 illustrating aspects of the present disclosure. In particular, FIG. 1 is a diagrammatic schematic view of the arrangement 100. In that regard, the arrangement 100 includes a pregnancy model 102 that includes a maternal model 104 and a fetal model 106, along with a neonatal model 108. In some instances, aspects of the present disclosure are configured for use with the simulators and the related features disclosed in U.S. patent application Ser. No. 11/952,559, U.S. patent application Ser. No. 11/952,606, U.S. patent application Ser. No. 11/952,636, U.S. patent application Ser. No. 11/952,669, U.S. patent application Ser. No. 11/952,698, U.S. Pat. No. 7,114,954, U.S. Pat. No. 6,758,676, U.S. Pat. No. 6,503,087, U.S. Pat. No. 6,527,558, U.S. Pat. No. 6,443,735, U.S. Pat. No. 6,193,519, and U.S. Pat. No. 5,853,292, each herein incorporated by reference in its entirety. For example, in some instances, one or more of the physiological models of the present disclosure are incorporated into the simulators, controllers, software, and/or user interfaces disclosed in these patents and applications. In that regard, the maternal model 104 is associated with a maternal simulator in some instances. Similarly, the fetal model 106 and/or the neonatal model 108 are associated with a fetal simulator and a neonatal simulator, respectively, in some instances.

As discussed in greater detail below, the maternal model 104, the fetal model 106, and/or the neonatal model 108 are utilized to control the respective simulated physiological characteristics of the simulators in order to simulate the physiological characteristics associated with one or more birthing scenarios. In that regard, the vital signs and physiological characteristics generated by the physiological models are readable or measurable on the simulators using standard medical equipment in some instances. In addition, the vital signs and physiological characteristics are visible on associated monitors and/or a user-interface control program in some embodiments.

Generally, two information pathways connect the maternal model 104, the fetal model 106, and the neonatal model 108. A first information pathway coordinates the interactions between maternal model 104 and the fetal model 106 (e.g., blood flows, gas exchanges, core temperature, etc.), while a second information pathway passes off the model parameters from the fetal model 106 to the neonatal model 108 at the end of a labor scenario. In that regard, the neonatal model 108 corresponds to the fetal model 106 after birth. Accordingly, in some instances the fetal model 106 and the neonatal model 108 are utilized to control the physiological characteristics of a single simulator or manikin. In other instances, the fetal model 106 is utilized to control a fetal simulator/manikin, while the neonatal model 108 is utilized to control the physiological characteristics of a neonatal simulator/manikin that is separate from the fetal simulator/manikin. In such instances, the model parameters of the neonatal model 108 are coordinated with those of the fetal model 106 such that the neonatal simulator/manikin exhibits physiological characteristics consistent with those of the fetal simulator/manikin used in a labor scenario. Accordingly, in some embodiments the neonatal model 108 and associated neonatal simulator/manikin are particularly suited for use in post-birth simulations.

Figure 2:
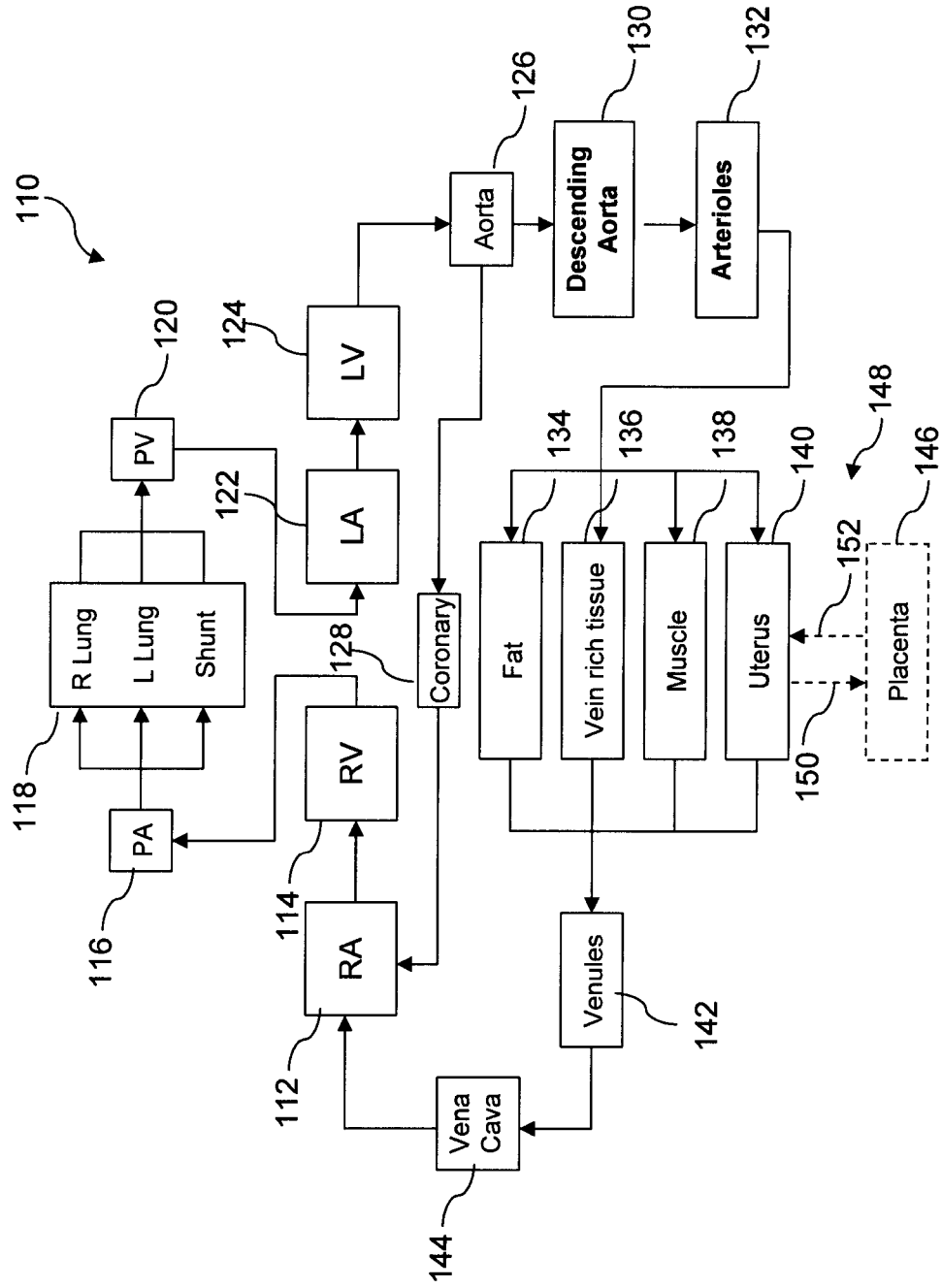
FIG. 2 is a diagrammatic schematic view of a maternal circulatory model of the arrangement of FIG. 1 according to one embodiment of the present disclosure.

Referring now to FIG. 2, shown therein is a diagrammatic schematic view of a maternal circulatory model 110 that makes up at least a portion of the maternal model 104 of the pregnancy model 102 of the arrangement 100 illustrated in FIG. 1, according to one embodiment of the present disclosure. Generally, the maternal circulatory model 110 is a multi-compartment circulatory model that includes simulated anatomical features of the natural circulatory system. In the illustrated embodiment of FIG. 2, the maternal circulatory model is an 19-compartment circulatory model. However, in other instances, the maternal circulatory model 110 includes other combinations of the anatomical features of the natural circulatory system. Generally, any combination of the anatomical features of the natural circulatory system may be included in the maternal circulatory model 110. The particular combination of anatomical features utilized in the maternal circulatory model 110 of FIG. 2 will now be discussed in greater detail.

As shown, the maternal circulatory model 110 includes a right atrium 112, a right ventricle 114, and a pulmonary artery 116. The maternal circulatory model 110 also includes respiratory features 118. In the illustrated embodiment, the respiratory features 118 include left and right lungs and a shunt. In some instances, characteristics of the respiratory features 118 are at least partially determined by a respiratory model, such as the respiratory model discussed below with respect to FIG. 5. Referring again to FIG. 2, the maternal circulatory model also includes a pulmonary vein 120, a left atrium 122, a left ventricle 124, and an aorta 126. As shown, the aorta 126 is connected to a coronary artery 128 that leads to the right atrium 112. In some instances, the aorta 126, the coronary artery 128, and the right atrium 112 form a maternal ischemia model. In general, the ischemia model is utilized to calculate characteristics of the components of the maternal circulatory model, including such things as the contractility of the four heart chambers, an ECG output of the maternal model, and/or other ischemia-determinant characteristics of the maternal circulatory model. In some instances, the maternal model includes a maternal cardiac dipole model based on these characteristics that generates 12-lead ECG waves for four heart chambers of the maternal circulatory model and also generates a contraction profile that includes timing and contractility of each of the four heart chambers during a contraction.

The aorta 126 of the maternal circulatory model 110 is also connected to a descending aorta 130 that leads to arterioles 132. The arterioles 132 lead to fat 134, vein-rich tissue 136, muscle 138, and a uterus 140. Generally, the fat 134, vein-rich tissue 136, muscle 138, and uterus 140 represent the tissues and organs of the mother and their corresponding effects on the maternal circulatory system. However, any combination and/or groupings of tissues and organs of the mother may be utilized in other embodiments to account for the effects of the tissues and organs of the mother on the maternal circulatory system. The fat 134, vein-rich tissue 136, muscle 138, and uterus 140 lead to venules 142. The venules 142 lead to a vena cava 144 that returns back to the right atrium 112. Generally, the right atrium 112, right ventricle 114, pulmonary artery 116, respiratory features 118, pulmonary vein 120, left atrium 122, left ventricle 124, aorta 126, coronary artery 128, descending aorta 130, arterioles 132, fat 134, vein rich tissue 136, muscle 138, uterus 140, venules 142, and vena cava 144 are interconnected in a manner simulating the interactions of the corresponding anatomical features of the natural circulatory system in order to define the maternal circulatory model 110.

As shown, the uterus 140 is connected to a placenta 146 of the fetal model 106. In that regard, the connection between the uterus 140 and the placenta 146 facilitates an exchange 148 between the maternal model 104 and the fetal model 106. The exchange 148 includes a transfer 150 from the uterus 140 to the placenta 146 and a transfer 152 from the placenta 146 back to the uterus 140. Generally, the transfer 150 simulates the sending of oxygen rich blood and nutrients to the fetus through the placenta, while the transfer 152 simulates the sending of blood with increased amounts of carbon dioxide from the fetus back to the mother through the placenta and into the uterus.

Figure 3:
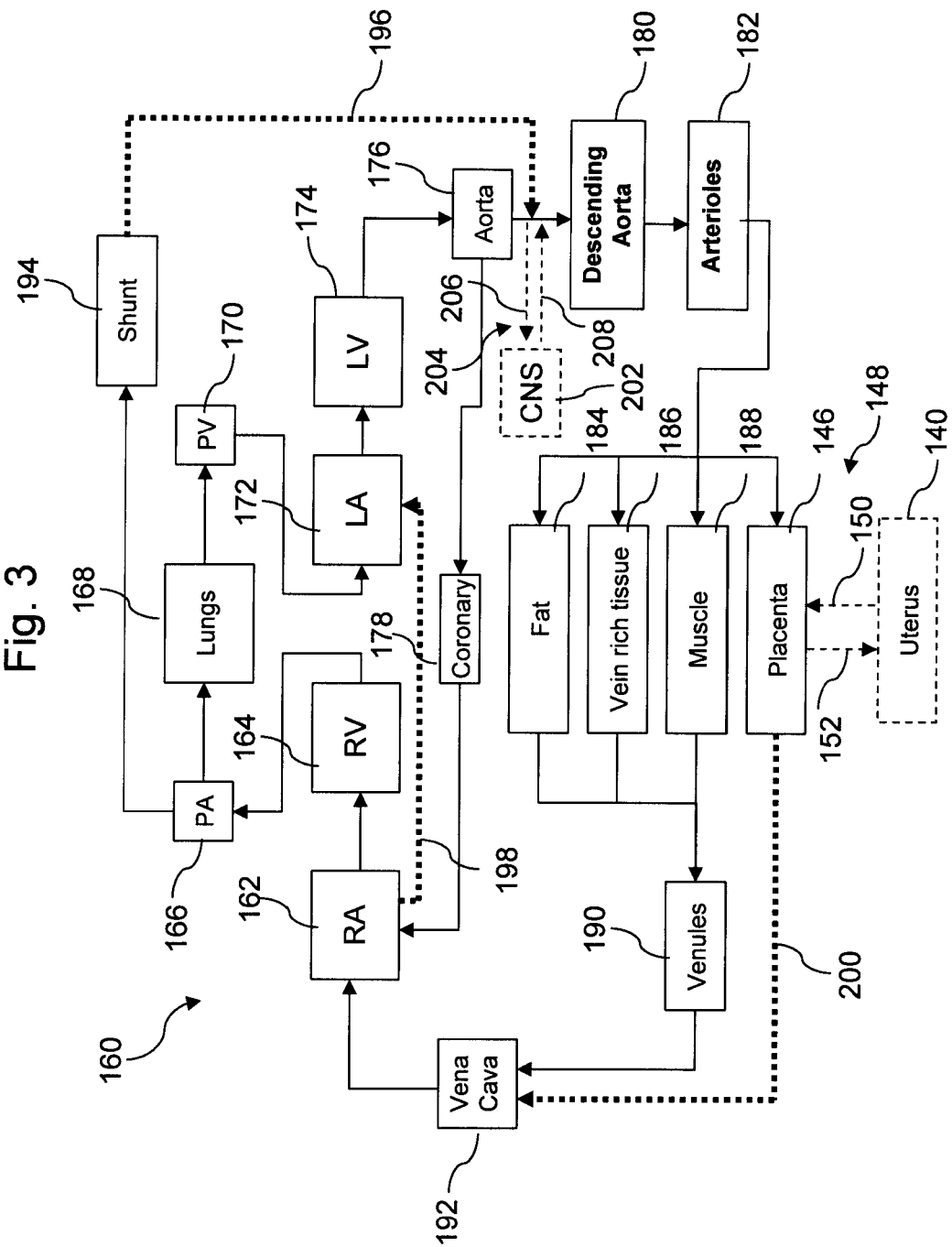
FIG. 3 is a diagrammatic schematic view of a fetal circulatory model of the arrangement of FIG. 1 according to one embodiment of the present disclosure.

Referring now to FIG. 3, shown therein is a diagrammatic schematic view of a fetal circulatory model 160 that makes up at least a portion of the fetal model 106 of the pregnancy model 102 of the arrangement 100 illustrated in FIG. 1, according to one embodiment of the present disclosure. Generally, the fetal circulatory model 160 is a multi-compartment circulatory model that includes simulated anatomical features of the natural circulatory system of a fetus. In the illustrated embodiment of FIG. 3, the fetal circulatory model 160 is an 18-compartment circulatory model. In that regard, the left and right lungs of the fetal simulator are combined into a single compartment in some instances. However, in other instances, the fetal circulatory model 160 includes other combinations of the anatomical features of the natural circulatory system. Generally, any combination of the anatomical features of the natural circulatory system may be included in the fetal circulatory model 160. The particular combination of anatomical features utilized in the fetal circulatory model 160 of FIG. 3 will now be discussed in greater detail.

As shown, the fetal circulatory model 160 includes a right atrium 162, a right ventricle 164, and a pulmonary artery 166. The fetal circulatory model 160 also includes lungs 168. However, as the fetus is not yet breathing the lungs 168 do not operate according to normal respiratory functions. Accordingly, whereas the respiratory features 118 of the maternal circulatory model 110, for example, may operate according to a respiratory model, such as the respiratory model described below in conjunction with FIG. 5, the lungs 168 of the fetal circulatory model 160 do not follow such respiratory models based on respiratory features that are being utilized for breathing. In that regard, the lungs 168 do not oxygenize the blood, but rather utilize some of the oxygen in the blood in order to maintain the health of the lungs.

Referring again to FIG. 3, the fetal circulatory model 160 also includes a pulmonary vein 170, a left atrium 172, a left ventricle 174, and an aorta 176. As shown, the aorta 176 is connected to a coronary artery 178 that leads to the right atrium 172. In some instances, the aorta 176, the coronary artery 178, and the right atrium 172 form a fetal ischemia model. In general, the fetal ischemia model is utilized to calculate characteristics of the components of the fetal circulatory model. In some instances, the fetal ischemia model is determines such characteristics as the contractility of the four heart chambers, an ECG output of the fetal model, and/or other ischemia-determinant characteristics of the fetal circulatory model.

The aorta 166 of the fetal circulatory model 160 is also connected to a descending aorta 180 that leads to arterioles 182. The arterioles 182 lead to fat 184, vein-rich tissue 186, muscle 188, and the placenta 146. Generally, the fat 184, vein-rich tissue 186, muscle 188, and placenta 146 represent the tissues and organs of the fetus and their corresponding effects on the fetal circulatory system. However, any combination and/or groupings of tissues and organs of the fetus may be utilized in other embodiments to account for the effects of the tissues and organs of the fetus on the fetal circulatory system. The fat 184, vein-rich tissue 186, muscle 188, and placenta 146 lead to venules 190. The venules 190 lead to a vena cava 192 that returns back to the right atrium 162. The fetal circulatory model 160 further includes a shunt 194 that is in communication with the pulmonary artery 166, as shown. In that regard, the fetal circulatory model 160 also includes a plurality of shunt flows as illustrated by flows 196, 198, and 200. Specifically, flow 196 illustrates the shunt flow between the shunt 194 and a fetal central nervous system model 202. Flow 198 illustrates the shunt flow between the right atrium 162 and the left atrium 172. Finally, flow 200 illustrates the shunt flow between the placenta 146 and the vena cava 192.

As mentioned above, the fetal circulatory model 160 includes a fetal central nervous system model 202. The connection between the fetal circulatory model 160 and the fetal central nervous system model 202 facilitates an exchange 204 between the circulatory system and the nervous system of the fetus. In particular, the exchange 204 includes a transfer 206 simulating the sending oxygen rich blood from the circulatory system to the central nervous system and a transfer 208 simulating the sending of blood with increased amounts of carbon dioxide from the central nervous system back into the circulatory system. The amount of oxygen utilized by the fetal central nervous system model 202 is influenced by both maternal conditions (e.g., oxygen partial pressure, cardiac output, uterine activity) and fetal conditions (e.g., fetal movement, oxygen level, cord compression, head compression, hemorrhage). Accordingly, the fetal central nervous system model 202 has a direct influence on characteristics of the fetal circulatory model, including fetal heart rate and oxygen level.

Generally, the right atrium 162, right ventricle 164, pulmonary artery 166, lungs 168, pulmonary vein 170, left atrium 172, left ventricle 174, aorta 176, coronary artery 178, descending aorta 180, arterioles 182, fat 184, vein rich tissue 186, muscle 188, placenta 146, venules 190, vena cava 192, shunt 194, and central nervous system 202 are interconnected in a manner simulating the interactions of the corresponding anatomical features of the natural circulatory system in order to define the fetal circulatory model 160.

As noted above, the connection between the uterus 140 and the placenta 146 facilitates the exchange 148 between the maternal model 104 and the fetal model 106. The exchange 148 includes the transfer 150 from the uterus 140 to the placenta 146 and the transfer 152 from the placenta 146 back to the uterus 140. Generally, the transfer 150 simulates the sending of oxygen rich blood and nutrients to the fetus through the placenta, while the transfer 152 simulates the sending of blood with increased amounts of carbon dioxide from the fetus back to the mother through the placenta and into the uterus. Accordingly, the exchange 148 is utilized to link the circulatory models 110, 160 of the maternal and fetal models 104, 106 in order to define the overall circulatory model for the pregnancy model 102. Particular interactions and relationships between the maternal model 104 and the fetal model 106, including the circulatory models 110, 160, are discussed below with respect to some exemplary physiological scenarios.

Figure 4:
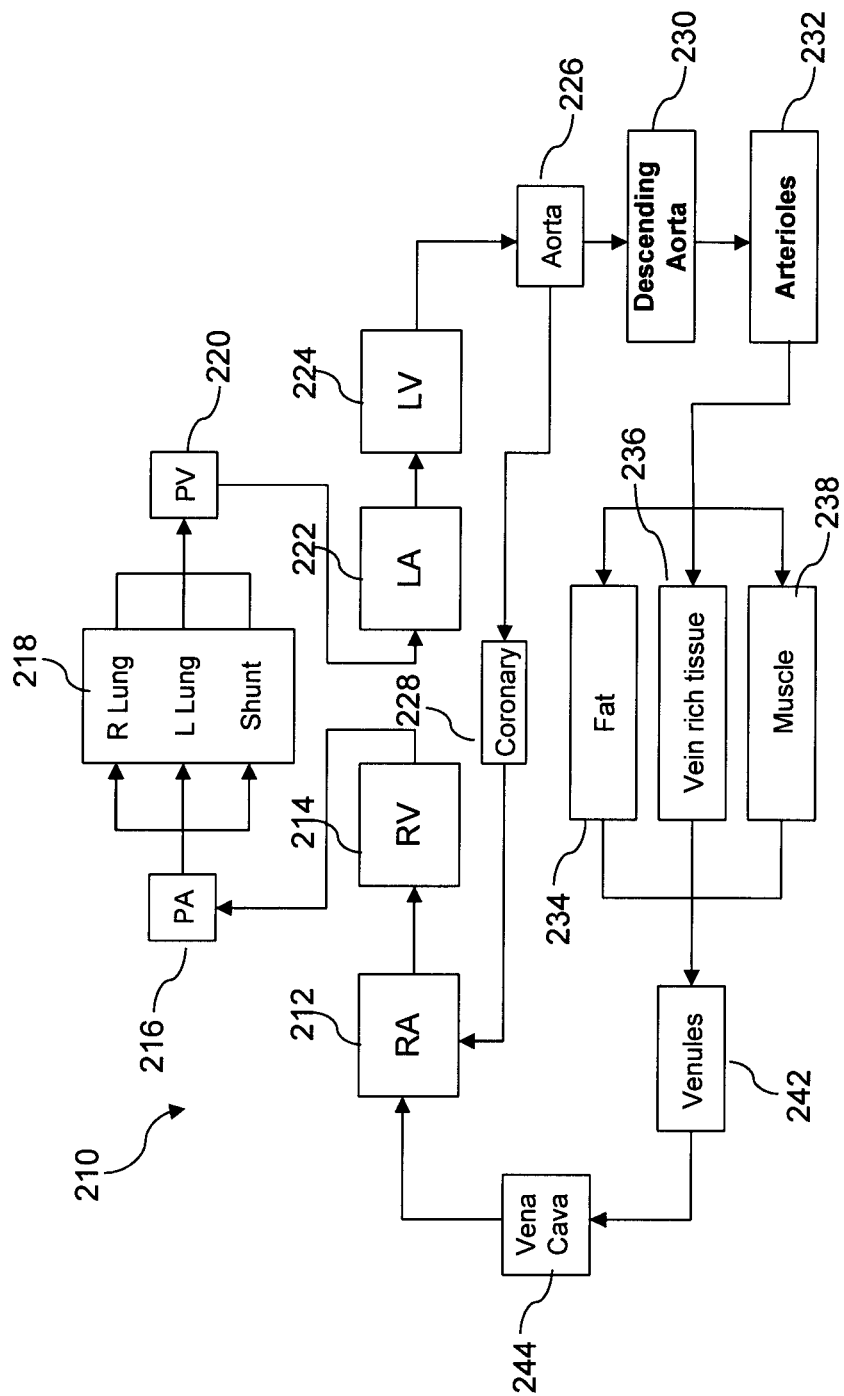
FIG. 4 is a diagrammatic schematic view of a neonatal circulatory model of the arrangement of FIG. 1 according to one embodiment of the present disclosure.

Referring now to FIG. 4, shown therein is a diagrammatic schematic view of a neonatal circulatory model 210 that makes up at least a portion of the neonatal model 108 of the arrangement 100 illustrated in FIG. 1, according to one embodiment of the present disclosure. Generally, the neonatal circulatory model 210 is a multi-compartment circulatory model that includes simulated anatomical features of the natural circulatory system. In the illustrated embodiment of FIG. 4, the neonatal circulatory model is a 18-compartment circulatory model. However, in other instances, the neonatal circulatory model 210 includes other combinations of the anatomical features of the natural circulatory system. Generally, any combination of the anatomical features of the natural circulatory system may be included in the neonatal circulatory model 210. The particular combination of anatomical features utilized in the neonatal circulatory model 210 of FIG. 4 will now be discussed in greater detail.

As shown, the neonatal circulatory model 210 includes a right atrium 212, a right ventricle 214, and a pulmonary artery 216. The neonatal circulatory model 210 also includes respiratory features 218. In the illustrated embodiment, the respiratory features 218 include left and right lungs and a shunt. In some instances, characteristics of the respiratory features 218 are at least partially determined by a respiratory model, such as the respiratory model discussed below with respect to FIG. 5. Referring again to FIG. 4, the neonatal circulatory model 210 also includes a pulmonary vein 220, a left atrium 222, a left ventricle 224, and an aorta 226. As shown, the aorta 226 is connected to a coronary artery 228 that leads to the right atrium 212. In some instances, the aorta 226, the coronary artery 228, and the right atrium 212 form a neonatal ischemia model. In general, the neonatal ischemia model is utilized to calculate characteristics of the components of the neonatal circulatory model, including such things as the contractility of the four heart chambers, an ECG output of the neonatal model, and/or other ischemia-determinant characteristics of the neonatal circulatory model. In some instances, the neonatal model includes a neonatal cardiac dipole model based on these characteristics that generates 12-lead ECG waves for the four heart chambers of the neonatal circulatory model and also generates a contraction profile that includes timing and contractility of each of the four heart chambers during a contraction.

The aorta 226 of the neonatal circulatory model 210 is also connected to a descending aorta 230 that leads to arterioles 232. The arterioles 232 lead to fat 234, vein-rich tissue 236, and muscle 238. Generally, the fat 234, vein-rich tissue 236, and muscle 238 represent the tissues and organs of the newborn and their corresponding effects on the neonatal circulatory system. However, any combination and/or groupings of tissues and organs of the newborn may be utilized in other embodiments to account for the effects of the tissues and organs of the newborn on the neonatal circulatory system. The fat 234, vein-rich tissue 236, and muscle 238 lead to venules 242. The venules 242 lead to a vena cava 244 that returns back to the right atrium 212. Generally, the right atrium 212, right ventricle 214, pulmonary artery 216, respiratory features 218, pulmonary vein 220, left atrium 222, left ventricle 224, aorta 226, coronary artery 228, descending aorta 230, arterioles 232, fat 234, vein rich tissue 236, muscle 238, venules 242, and vena cava 244 are interconnected in a manner simulating the interactions of the corresponding anatomical features of the natural circulatory system in order to define the neonatal circulatory model 210.

Figure 5:
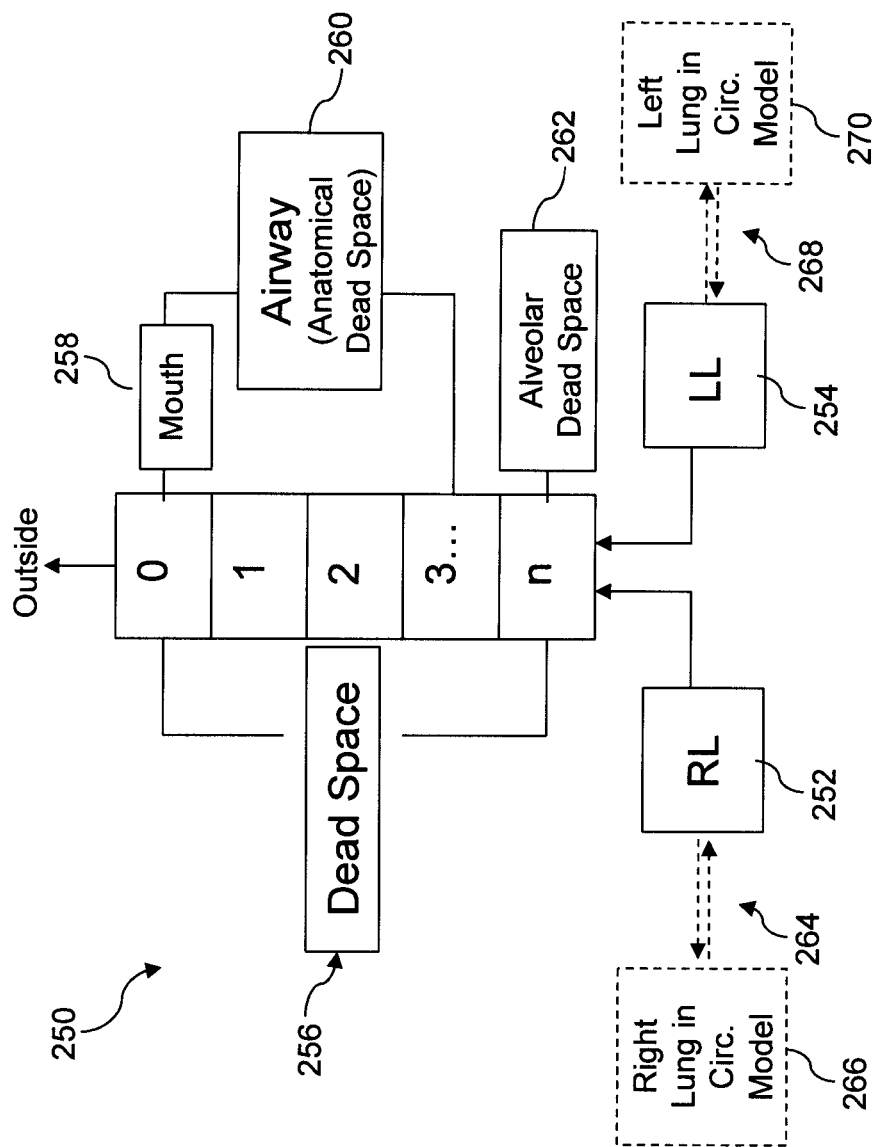
FIG. 5 is a diagrammatic schematic view of a respiratory model of the arrangement of FIG. 1 according to one embodiment of the present disclosure.

Referring now to FIG. 5, shown therein is a diagrammatic schematic view of a respiratory model 250 of the arrangement of FIG. 1 according to one embodiment of the present disclosure. In some instances, the respiratory model 250 makes up at least a portion of the maternal model 104 and/or the neonatal model 108 of the arrangement 100. It is understood that the actual parameters of the respiratory model 250 are tailored for the particular model in which the respiratory model is to be used. For example, Table 4 below provides exemplary parameter values for different models representative of patient simulators of varying age, gender, and/or physiological condition.

As shown, the respiratory model 250 includes a right lung 252, a left lung 254, and dead space 256. In the illustrated embodiment the dead space 256 includes a mouth 258, airway 260, and alveolar space 262. An information exchange 264 conveys information relating to the right lung 252 to a corresponding right lung 266 of a circulatory model, in some instances. For example, the information exchange 264 sends information related to the right lung 252 of the respiratory model 250 to the circulatory model 110 of the maternal model 104 such that the information related to the right lung 252 is utilized as part of characteristics of the respiratory features 118 of the circulatory model 110. Similarly, an information exchange 268 conveys information relating to the left lung 254 to a corresponding left lung 270 of a circulatory model, in some instances. For example, the information exchange 268 sends information related to the left lung 254 of the respiratory model 250 to the circulatory model 110 of the maternal model 104 such that the information related to the left lung 254 is utilized as part of characteristics of the respiratory features 118 of the circulatory model 110. The information exchanges 264, 268 are similarly used in conjunction with the respiratory features 218 of the neonatal circulatory model 210 in some embodiments.

As a general matter, the components and/or the values associated with the components of the circulatory models 110, 160, 210 and the respiratory model 250 are modifiable in order to simulate patients of varying age, gender, and/or pathologies. In short, the components and associated values of the models can be varied to simulate a seemingly infinite number of patient conditions, each having different baseline physiological characteristics. Accordingly, below are a series of tables identifying baseline physiological characteristics for seven different simulated patients: an average adult male, an average adult female, a pregnant female, a fetus (38 weeks), a newborn (38 weeks), a 1 year old, and a 5 year old. It is understood that the baseline values identified in the tables are exemplary in nature and in no way limit the available values for use with the present disclosure. To the contrary, it is expected that the baseline values set forth in the tables will be modified to define particular physiological characteristics associated with a desired patient scenario. Generally, the baseline values can be modified to correspond to any value necessary to create the desired patient scenario.

Table 1 below sets forth some baseline values for general parameters of the circulatory models of the present disclosure. In particular, Table 1 identifies the corresponding weight (kg), blood volume (ml), metabolism rate (ml/kg/min), heart rate (beats/min), blood pressure (mmHg), heart weight (g), baroreflex gain (index), and hematocrit (%) for each patient model.

TABLE 1

Table 1. Default Values for General Parameters of the Circulatory Models

| | Male | Female | Female (Pregnant) | Fetus | Newborn | 1 year-old | 5 year-old |
|---|---|---|---|---|---|---|---|
| Weight(kg) | 75 | 55 | 85 | 2.5 | 2.5 | 10 | 18.25 |
| Blood Volume(ml) | 5000 | 4700 | 6750 | 225 | 225 | 900 | 1642.5 |
| Metabolism rate(ml/kg/min) | 3 | 3 | 3.5 | 7 | 11 | 8 | 5 |
| Heart Rate (beats/min) | 75 | 75 | 85 | 140 | 140 | 140 | 95 |
| Blood Pressure (mmHg) | 120/81 | 113/74 | 105/60 | 53/37 | 66/48 | 88/64 | 99/66 |
| Heart Weight(g) | 300 | 300 | 300 | 25 | 25 | 90 | 180 |
| BaroReflex Gain | 2 | 2 | 2 | 0.5 | 2 | 2 | 2 |
| Hematocrit(%) | 44 | 44 | 44 | 47 | 47 | 46 | 45 |

Table 2 below sets forth some baseline values for particular compartments of the circulatory models of the present disclosure. In particular, Table 2 identifies the corresponding volume (ml) and elastance (mmHg/ml) for the various compartments and related anatomy of the circulatory models.

TABLE 2

Table 2. Default Values for Compartments of the Circulatory Models

| | Male | Female | Female (Pregnant) | Fetus | Newborn | 1 year-old | 5 year-old |
|---|---|---|---|---|---|---|---|
| LA-unstressed volume | 30 | 28.2 | 30 | 1.35 | 1.35 | 5.4 | 9.855 |
| LA-elastance | 0.12 | 0.1149 | 0.12 | 2.1333 | 1.3333 | 0.3667 | 0.2374 |
| LV-unstressed volume | 30 | 28.2 | 30 | 1.35 | 1.35 | 5.4 | 9.855 |
| LV-elastance | 0.08 | 0.0766 | 0.08 | 1.4222 | 0.8889 | 0.2444 | 0.1583 |
| Aorta-unstressed volume | 28 | 26.32 | 37.8 | 1.26 | 1.26 | 5.04 | 9.198 |
| Aorta-elastance | 3 | 2.8724 | 3 | 69.33333333 | 43.33333 | 11.9167 | 7.4201 |
| Intrathoracic Arteries-unstressed volume | 112 | 105.28 | 156.8 | 5.04 | 5.04 | 20.16 | 36.792 |
| Intrathoracic Arteries-elastance | 1.5 | 1.4362 | 1.5 | 34.6667 | 21.6667 | 5.9583 | 3.7100 |
| Extrathoracic Arteries-unstressed volume | 370 | 347.8 | 518 | 16.65 | 16.65 | 66.6 | 121.545 |
| Extrathoracic Arteries-elastance | 1 | 0.9574 | 1 | 23.1111 | 14.4444 | 3.972222 | 2.4734 |
| Muscle-unstressed volume | 35 | 32.9 | 49 | 1.575 | 1.575 | 6.3 | 11.4975 |
| Muscle-elastance | 1.5 | 1.43617 | 1.5 | 34.6667 | 21.66667 | 5.9583 | 3.7100 |
| Vein Rich Compartment-unstressed volume | 139 | 130.66 | 194.6 | 6.255 | 6.255 | 25.02 | 45.6615 |
| Vein Rich Compartment-elastance | 0.37 | 0.3543 | 0.37 | 8.5511 | 5.344444 | 1.4697 | 0.9151446 |
| Fat-unstressed volume | 11 | 10.34 | 15.4 | 0.495 | 0.495 | 1.98 | 3.6135 |
| Fat-elastance | 4.5 | 4.3085 | 4.5 | 104 | 65 | 17.875 | 11.1301 |
| Extrathoracic Veins-unstressed volume | 1036.58 | 974.3852 | 1451.2119 | 46.6461 | 46.6461 | 186.5844 | 340.5165 |

TABLE 2-continued

Table 2. Default Values for Compartments of the Circulatory Models

|  | Male | Female | Female (Pregnant) | Fetus | Newborn | 1 year-old | 5 year-old |
|---|---|---|---|---|---|---|---|
| Extrathoracic Veins-elastance | 0.017 | 0.0163 | 0.017 | 0.3929 | 0.2456 | 0.0675 | 0.0420 |
| Intrathoracic Veins-unstressed volume | 1216.855 | 1143.843 | 1703.5965 | 54.7585 | 54.7585 | 219.0338 | 399.7367 |
| Intrathoracic Veins-elastance | 0.018 | 0.017234 | 0.018 | 0.416 | 0.26 | 0.0715 | 0.0445 |
| RA-unstressed volume | 30 | 28.2 | 30 | 1.35 | 1.35 | 5.4 | 9.855 |
| RA-elastance | 0.1 | 0.0957 | 0.1 | 1.7778 | 1.1111 | 0.3056 | 0.1979 |

Table 3 below sets forth some baseline values for vessel resistance (mmHg*sec/ml) of the various compartments and related anatomy of the circulatory models of the circulatory models of the present disclosure.

TABLE 3

Table 3. Default Values for Vessel Resistance of the Circulatory Models

|  | Male | Female | Female (Pregnant) | Fetus | Newborn | 1 year-old | 5 year-old |
|---|---|---|---|---|---|---|---|
| LA-LV | 0.0072 | 0.0069 | 0.0065 | 0.1287 | 0.0804 | 0.0221 | 0.0143 |
| LV-Aorta | 0.0172 | 0.0165 | 0.0165 | 0.3065 | 0.1916 | 0.0527 | 0.0341 |
| Aorta-IntraAtery | 0.0261 | 0.0250 | 0.0209 | 0.464 | 0.29 | 0.0798 | 0.0516 |
| IntraArtery-ExtraArtery | 0.0486 | 0.0052 | 0.0048 | 0.1248 | 0.078 | 0.0215 | 0.0139 |
| ExtraArtery-Muscle | 4.1 | 3.9255 | 3.28 | 72.8889 | 45.5556 | 12.5278 | 8.1126 |
| ExtraArtery-VeinRich Comp | 1.14 | 1.0915 | 0.912 | 20.2667 | 12.6667 | 3.4833 | 2.2557 |
| ExtraArtery-Fat | 12.8 | 12.2553 | 10.24 | 227.5556 | 142.2222 | 39.1111 | 25.3272 |
| Muscle-ExtraVein | 0.5 | 0.4787 | 0.4 | 8.8889 | 5.5556 | 1.5278 | 0.9893 |
| VeinRich Comp-ExtraVein | 0.14 | 0.1340 | 0.112 | 2.4889 | 1.5556 | 0.4278 | 0.2770 |
| Fat-ExtraVein | 1.55 | 1.4840 | 1.24 | 27.5556 | 17.2222 | 4.7361 | 3.0670 |
| ExtraVein-IntraVein | 0.09 | 0.0862 | 0.072 | 1.6 | 1 | 0.275 | 0.1781 |
| IntraVein-RA | 0.003 | 0.0029 | 0.003 | 0.0533 | 0.0333 | 0.0092 | 0.0059 |
| RA-RV | 0.003 | 0.0029 | 0.003 | 0.0533 | 0.0333 | 0.0092 | 0.0059 |
| RV-PA | 0.003 | 0.0029 | 0.003 | 0.0533 | 0.0333 | 0.0092 | 0.0059 |
| PA-Rlung/Llung | 0.205 | 0.1963 | 0.1435 | 3.6444 | 2.2778 | 0.6264 | 0.4056 |
| PA-Shunt flow | 4 | 3.8298 | 2.8 | 35.5556 | 44.4444 | 12.2222 | 7.9148 |
| Rlung/Llung-PV | 0.06 | 0.0574 | 0.042 | 1.0667 | 0.6667 | 0.1833 | 0.1187 |
| Shunt flow-PV | 2.5 | 2.3936 | 1.75 | NA | 27.7778 | 7.6389 | 4.9467 |
| PV-LA | 0.003 | 0.0029 | 0.003 | 0.0533 | 0.0333 | 0.0092 | 0.0059 |
| ExtraA-Ut | NA | NA | 3.45 | NA | NA | NA | NA |
| UT-ExtraV | NA | NA | 1.85 | NA | NA | NA | NA |
| RA-LA | NA | NA | NA | 0.1 | NA | NA | NA |
| ExtraArtery-Pla | NA | NA | NA | 2 | NA | NA | NA |
| Pla-IntraV | NA | NA | NA | 1.6 | NA | NA | NA |
| Shunt-IntraA | NA | NA | NA | 35 | NA | NA | NA |

Table 4 below sets forth some baseline values for general parameters of the respiratory models of the present disclosure. In particular, Table 4 identifies the corresponding residual volume (L), expiratory residual capacity (L), tidal volume (L), airway resistance (normal, slightly high, and high), anatomical dead space (L), and alveolar dead space (L) for each patient model. In some instances, airway resistance is measured on a scale from 1-5, where 5 is normal airway resistance and smaller values are indicative of increased airway resistance (e.g., 3 is indicative of slightly high airway resistance, 2 is indicative of high airway resistance, and 1 is indicative of extremely high airway resistance). Other airway resistance scales are utilized in other embodiments.

TABLE 4

Table 4. Default Values for Parameters of the Respiratory Models

|  | Male | Female | Female (Pregnant) | Fetus | Newborn | 1 year-old | 5 year-old |
|---|---|---|---|---|---|---|---|
| Residual Volume(L) | 1.2 | 1.2 | 2.2 | NA | 0.0375 | 0.15 | 0.27375 |
| Expiratory Residual Capacity(L) | 1.1 | 1.1 | 1.1 | NA | 0.0375 | 0.15 | 0.27375 |
| Tidal Volume | 0.5 | 0.46 | 0.6 | NA | 0.0175 | 0.07 | 0.12775 |
| Airway Resistance | normal | normal | Normal | NA | high | High | Slightly High |
| Dead Space(Anatomic)(L) | 0.15 | 0.15 | 0.15 | NA | 0.004725 | 0.0189 | 0.0344925 |
| Dead Space(Alveolar)(L) | 0.005 | 0.005 | 0.005 | NA | 0.000525 | 0.0021 | 0.0038325 |

In use, the physiological models of the present disclosure are utilized to control the physiological characteristics of patient simulators in order to provide more realistic medical training environments. For example, in some instances, the pregnancy model 102 is utilized to simulate one or more birthing scenarios where the physiological characteristics of the maternal model 104 and the fetal model 106 are configured to emulate the natural physiological characteristics associated with the one or more birthing scenarios. In that regard, the maternal model 104 is utilized to control aspects of a maternal simulator and the fetal model 106 is utilized to control aspects of a fetal simulator associated with the maternal simulator. In some instances, the maternal model 104 includes one or more of a circulatory model, a respiratory model, an ischemia model, and a cardiac dipole model, while the fetal model includes one or more of a circulatory model, an ischemia model, and a central nervous system model.

In some embodiments, a controller coordinates parameters of the maternal model 104 and the fetal model 106 based on a desired physiological birthing scenario. In some instances, the desired physiological birthing scenario is selectable by a user or instructor through a user interface associated with the simulators. The desired physiological birthing scenario is selected from a plurality of scenarios, including maternal bleeding (varying amounts), maternal uterine rupture (varying sizes), maternal apnea, maternal VFib, maternal VTach, fetal bleeding (varying amounts), fetal cord compression, normal labor, shoulder dystocia, breech presentation, cord prolapse, peripartum hemorrhage, amniotic fluid embolism, preterm labor, and/or other physiological birthing scenarios.

Aspects of some of these scenarios are discussed in greater detail below. In that regard, the effects of the physiological birthing scenarios on various vital signs will generally be discussed in relation to exemplary starting values for vital signs of the maternal and fetal models. For example, Table 5 below provides examples of such starting values. The values in Table 5 generally represent a starting point where both the mother and fetus are healthy. For sake of simplicity, these healthy starting values will be used to discuss the birthing scenarios below. However, it is understood that the maternal model and/or the fetal model may have other starting values (including values representative of various pathologies). Further, the birthing scenarios discussed generally only include a single variable or condition. However, it is understood that the individual birthing scenarios discussed below may be combined, either concurrently or consecutively, with one or more other birthing scenarios such that multiple variables or conditions are presented simultaneously or in series.

TABLE 5

Table 5. Exemplary Starting Values for Birthing Scenarios

| Maternal Model Properties | |
|---|---|
| Resp. Rate | 20 |
| Osat | 96% |
| EtCO2 | 32 |
| ECG | Sinus |
| HR | 85 |
| BP | 112/67 |
| Temperature | 37 |
| Fetal Model Properties | |
| Baseline HR | 135 |
| Variability | Moderate |
| Episodic Ch. | Reactive |
| Periodic Ch. | None |
| Variables | None |

Table 6 below describes the variations in the vital signs of the maternal and fetal models associated with maternal bleeding. The maternal bleeding of Table 6 is intended to represent bleeding out of local tissue. For example, in the context of the maternal circulatory model 110 described above, bleeding would be out of one or more of the fat 134, vein-rich tissue 136, and muscle 138. The rate of bleeding can be varied to simulate different levels of trauma. In that regard, Table 7 below provides the corresponding values for the vital signs of the maternal and fetal models for a low rate of bleeding, while Table 8 below provides the corresponding values for a high rate of bleeding.

TABLE 6

Table 6. Variations in Values for Maternal Bleeding

| Maternal Model Properties | |
|---|---|
| Resp. Rate | Increase to take out additional CO2 that has built up |
| Osat | Decrease due to increased metabolism rate |
| EtCO2 | Increase due to increased CO2 formation |
| ECG | Sinus -> Vfib (due to ischemia of the heart) |
| HR | Increase to compensate for decreased BP (BaroReflex) |
| BP | Decrease(blood loss) -> maintain (increased HR) -> 0 (ischemia) |
| Temperature | Increase (fever) -> decrease (death) |

TABLE 6-continued

Table 6. Variations in Values for Maternal Bleeding

Fetal Model Properties

| | |
|---|---|
| Baseline HR | Decrease at $4^{th}$ min (delayed reaction, momOsat 80%) |
| Variability | Mod -> minimal -> absent |
| Episodic Ch. | Reactive -> none |
| Periodic Ch. | None -> late decel (poor exchange) -> none (no response) |
| Variables | None (no cord compression) |

TABLE 7

Table 7. Time Lapse of Values for Maternal Bleeding (Low Rate)

| Parameter | 30 s | 1 min | 2 min | 3 min | 4 min | 5 min | 6 min | 7 min | 8 min |
|---|---|---|---|---|---|---|---|---|---|
| Resp. Rate | 20 | 21 | 24 | 41 | 45 | 0 | | | |
| Osat | 96 | 96 | 93 | 87 | 80 | 76 | 76 | | |
| EtCO2 | 32 | 35 | 36 | 33 | 33 | 0 | | | |
| Car. Rhy. | Sinus | Sinus | Sinus | Sinus | Sinus | Vfib | Vfib | Vfib | Vfib |
| HR | 124 | 132 | 135 | 135 | 137 | 0 | 0 | 0 | 0 |
| BP | 77/61 | 76/63 | 75/62 | 75/62 | 76/63 | 0 | 0 | 0 | 0 |
| Temp | 37.7 | 38.3 | 39.1 | 39.8 | 40.4 | 40.2 | 39 | 37 | 35 |
| Baseline HR | 135 | 140 | 140 | 140 | 125 | 111 | 85 | 75 | 71 |
| Var | mod | mod | mod | minimal | minimal | absent | absent | absent | absent |
| Spont. Ch | reactive | reactive | reactive | reactive | reactive | none | none | none | none |
| Periodic Ch | none | none | none | none | none | none | late decels | none | none |
| Var. Ch | none | none | none | none | none | none | none | none | none |

TABLE 8

Table 8. Time Lapse of Values for Maternal Bleeding (High Rate)

| Parameter | 30 s | 1 min | 2 min | 3 min | 4 min | 5 min | 6 min |
|---|---|---|---|---|---|---|---|
| RR | 22 | 22 | 23 | 38 | 45 | 0 | |
| Osat | 96 | 97 | 94 | 86 | 80 | 78 | |
| EtCO2 | 31 | 30 | 37 | 34 | 33 | 0 | |
| Car. Rhy. | Sinus | Sinus | Sinus | Sinus | Sinus | Vfib | |
| HR | 110 | 133 | 135 | 137 | 135 | 0 | |
| BP | 86/62 | 74/61 | 75/61 | 75/63 | 74/62 | 0/0 | |
| Temp | 37.4 | 38 | 39 | 39.8 | 40.4 | 40.3 | |
| Baseline | 135 | 135 | 140 | 125 | 111 | 91 | 71 |
| Var | mod | mod | minimal | minimal | minimal | absent | absent |
| Spont. Ch | reactive | reactive | reactive | reactive | non-reactive | late decels | late decels |
| Periodic Ch | none | none | none | none | none | none | none |
| Var. Ch | none | none | none | none | none | none | none |

Table 9 below describes the variations in the vital signs of the maternal and fetal models associated with a uterine rupture. The uterine rupture of Table 9 is intended to represent bleeding out of the uterus of the maternal simulator. For example, in the context of the maternal circulatory model 110 described above, bleeding would be out of the uterus 140. The rate of bleeding can be varied to simulate different levels of trauma. In that regard, Table 10 below provides the corresponding values for the vital signs of the maternal and fetal models for a low rate of bleeding. There will be less latency of fetal deterioration relative the maternal bleeding of local tissue discussed above due to direct loss of uterine blood, which is the oxygen source for the fetus.

TABLE 9

Table 9. Variations in Values for Uterine Rupture

Maternal Model Properties

| | |
|---|---|
| Resp. Rate | Increase to take out additional CO2 that has built up |
| Osat | Decrease due to increased metabolism rate |
| EtCO2 | Increase due to increased CO2 formation |
| ECG | Sinus -> Vfib (due to ischemia of the heart) |
| HR | Increase to compensate decreased BP (BaroReflex) |

TABLE 9-continued

Table 9. Variations in Values for Uterine Rupture

| | |
|---|---|
| BP | Decrease(blood loss) -> maintain (increased HR) -> 0(ischemia) |
| Temperature | Increase (fever) -> decrease (death) |

Fetal Model Properties

| | |
|---|---|
| Baseline HR | Decrease at $10^{th}$ min (less delayed reaction, mom's Osat 93%) |
| Variability | Mod -> minimal -> absent |
| Episodic Ch. | Reactive -> none |
| Periodic Ch. | None -> late decel (poor exchange) -> none (no response) |
| Variables | None (no cord compression) |

TABLE 10

Table 10. Time Lapse of Values for Uterine Rupture (Low Rate)

| Parameter | 30 s | 1 min | 2 min | 3 min | 4 min | 5 min | 6 min |
|---|---|---|---|---|---|---|---|
| Resp. Rate | 22 | 22 | 21 | 21 | 21 | 21 | 23 |
| Osat | 96 | 96 | 96 | 96 | 95 | 96 | 95 |
| EtCO2 | 32 | 31 | 31 | 31 | 31 | 34 | 32 |
| Car. Rhy. | Sinus | Sinus | Sinus | Sinus | Sinus | Sinus | Sinus |
| HR | 83 | 101 | 109 | 106 | 107 | 109 | 108 |
| BP | 110/64 | 100/65 | 94/66 | 94/66 | 91/66 | 93/64 | 90/66 |
| Temp | 37 | 37 | 37 | 37 | 37 | 37.3 | 37.3 |
| Baseline HR | 125 | 135 | 135 | 135 | 135 | 135 | 135 |
| Var | minimal | mod | mod | mod | mod | mod | mod |
| Spont. Ch | reactive | reactive | reactive | reactive | reactive | reactive | reactive |
| Periodic Ch | none | none | none | none | none | none | none |
| Var. Ch | none | none | none | none | none | none | none |

| Parameter | 7 min | 8 min | 10 min | 12 min | 14 min | 16 min | 18 min |
|---|---|---|---|---|---|---|---|
| Resp. Rate | 24 | 23 | 26 | 35 | 45 | 45 | 0 |
| Osat | 95 | 95 | 93 | 88 | 83 | 75 | 0 |
| EtCO2 | 30 | 31 | 30 | 30 | 28 | 30 | 0 |
| Car. Rhy. | Sinus | Sinus | Sinus | Sinus | Sinus | Sinus | Vfib |
| HR | 119 | 115 | 125 | 136 | 135 | 138 | 0 |
| BP | 86/65 | 91/66 | 81/64 | 77/64 | 77/64 | 78/65 | 0 |
| Temp | 37.3 | 37.5 | 37.6 | 39.1 | 39.1 | 40.3 | 39.9 |
| Baseline HR | 135 | 135 | 131 | 85 | 65 | 0 | 0 |
| Var | mod | mod | minimal | absent | absent | subtle | none |
| Spont. Ch | reactive | reactive | reactive | none | none | none | none |
| Periodic Ch | none | none | none | late decels | late decels | none | none |
| Var. Ch | none | none | none | none | none | none | none |

Table 11 below describes the variations in the vital signs of the maternal and fetal models associated with maternal apnea. Table 12 below provides the corresponding values for the vital signs of the maternal and fetal models for an exemplary embodiment of maternal apnea. Note that the "??" values for Osat in Table 12 are representative of a Osat less than 60%.

TABLE 11

Table 11. Variations in Values for Maternal Apnea

| Maternal Model Properties | |
|---|---|
| Resp. Rate | 0 (Apnea) |
| Osat | Quickly drop -> loss of signal (low reading) |
| EtCO2 | 0 (Apnea) |
| ECG | Sinus -> Vfib (due to ischemia of the heart) |
| HR | No change -> 0 |
| BP | Decrease(ischemia) -> 0(ischemia) |
| Temperature | No change |
| Fetal Model Properties | |
| Baseline HR | Decrease at $3^{rd}$ min -> 0 at $8^{th}$ min |
| Variability | Mod -> minimal -> absent |
| Episodic Ch. | Reactive -> none |
| Periodic Ch. | None -> late decel (poor exchange) -> none (no response) |
| Variables | None (no cord compression) |

TABLE 12

Table 12. Time Lapse of Values for Maternal Apnea

| Parameter | 30 s | 1 min | 2 min | 3 min | 4 min | 5 min | 6 min | 7 min | 8 min |
|---|---|---|---|---|---|---|---|---|---|
| RR | 0 | 0 | 0 | 0 | 0 | 0 | 0 | 0 | 0 |
| Osat | 97 | 88 | ?? | ?? | ?? | ?? | ?? | ?? | ?? |
| EtCO2 | 0 | 0 | 0 | 0 | 0 | 0 | 0 | 0 | 0 |
| Car. Rhy. | Sinus | Sinus | Sinus | Sinus | Sinus | Sinus | Sinus | Sinus | VFib |
| HR | 85 | 85 | 85 | 85 | 85 | 85 | 85 | 85 | 0 |
| BP | 100/62 | 96/59 | 94/57 | 94/56 | 95/58 | 91/59 | 88/58 | 68/45 | 0 |
| Temp | 37 | 37 | 37 | 37 | 37 | 37 | 37 | 37 | 37 |
| Baseline | 135 | 135 | 135 | 120 | 95 | 80 | 65 | 60 | 0 |
| Var | mod | mod | minimal | minimal | absent | absent | absent | absent | none |
| Spont. Ch | reactive | reactive | reactive | non reactive | none | none | none | none | none |
| Periodic Ch | none | none | none | none | none | late decels | late decels | late decels | none |
| Var. Ch | none | none | none | none | none | none | none | none | none |

Table 13 below describes the variations in the vital signs of the maternal and fetal models associated with maternal ventricular fibrillation (VFib). Table 14 below provides the corresponding values for the vital signs of the maternal and fetal models for an exemplary embodiment of maternal VFib. Notably, compared to maternal apnea scenario discussed above, in the maternal VFib scenario, the maternal simulator stops using oxygen. Accordingly, there's more oxygen supply for fetus and, therefore, the fetus is able to maintain good condition for longer (8 minutes in the illustrated embodiment).

Table 15 below describes the variations in the vital signs of the maternal and fetal models associated with maternal ventricular tachycardia (VTach). Table 16 below provides the corresponding values for the vital signs of the maternal and fetal models for an exemplary embodiment of maternal VFib. The slight deterioration in fetal condition is due to decreased maternal cardiac output which leads to decreased blood flow to uterus.

TABLE 13

Table 13. Variations in Values for Maternal VFib

| Maternal Model Properties | |
|---|---|
| Resp. Rate | 0 (VFib) |
| Osat | Immediate loss of signal (HR = 0) |
| EtCO2 | 0 (VFib) |
| ECG | VFib |
| HR | 0 (VFib) |
| BP | 0 (VFib) |
| Temperature | No change |
| Fetal Model Properties | |
| Baseline HR | Decrease at $9^{th}$ min -> 0 at $13^{th}$ min |
| Variability | Mod -> minimal -> absent |
| Episodic Ch. | Reactive -> none |
| Periodic Ch. | None -> late decel (poor exchange) -> none (no response) |
| Variables | None (no cord compression) |

TABLE 15

Table 15. Variations in Values for Maternal VTach

| Maternal Model Properties | |
|---|---|
| Resp. Rate | Small variation (normal) |
| Osat | Small variation (normal) |
| EtCO2 | Small variation (normal) |
| ECG | Vtach |
| HR | 120 |
| BP | 60/45 + Small variation (normal) |
| Temperature | No change |
| Fetal Model Properties | |
| Baseline HR | Decrease at $11^{th}$ min -> maintain at 120 bpm |
| Variability | Mod -> minimal |
| Episodic Ch. | Reactive -> non reactive |
| Periodic Ch. | None |
| Variables | None (no cord compression) |

TABLE 14

Table 14. Time Lapse of Values for Maternal VFib

| Parameter | 30 s | 1 min | 2 min | 3 min | 4 min | 5 min | 6 min | 7 min |
|---|---|---|---|---|---|---|---|---|
| RR | 0 | 0 | 0 | 0 | 0 | 0 | 0 | 0 |
| Osat | ?? | ?? | ?? | ?? | ?? | ?? | ?? | ?? |
| EtCO2 | 0 | 0 | 0 | 0 | 0 | 0 | 0 | 0 |
| Car. Rhy. | Vfib | Vfib | Vfib | Vfib | Vfib | Vfib | Vfib | Vfib |
| HR | 0 | 0 | 0 | 0 | 0 | 0 | 0 | 0 |
| BP | 0 | 0 | 0 | 0 | 0 | 0 | 0 | 0 |
| Temp | 37 | 37 | 37 | 37 | 37 | 37 | 37 | 37 |
| Baseline | 140 | 140 | 140 | 140 | 140 | 140 | 140 | 140 |
| Var | mod | mod | mod | mod | mod | mod | mod | mod |
| Spont. Ch | reactive | reactive | reactive | reactive | reactive | reactive | reactive | reactive |
| Periodic Ch | none | none | none | none | none | none | none | none |
| Var. Ch | none | none | none | none | none | none | none | none |

| Parameter | 8 min | 9 min | 10 min | 11 min | 12 min | 13 min | 13 min 15 s |
|---|---|---|---|---|---|---|---|
| RR | 0 | 0 | 0 | 0 | 0 | 0 | 0 |
| Osat | ?? | ?? | ?? | ?? | ?? | ?? | ?? |
| EtCO2 | 0 | 0 | 0 | 0 | 0 | 0 | 0 |
| Car. Rhy. | Vfib | Vfib | Vfib | Vfib | Vfib | Vfib | Vfib |
| HR | 0 | 0 | 0 | 0 | 0 | 0 | 0 |
| BP | 0 | 0 | 0 | 0 | 0 | 0 | 0 |
| Temp | 37 | 37 | 37 | 37 | 37 | 37 | 37 |
| Baseline | 135 | 115 | 85 | 75 | 71 | 60 | 0 |
| Var | minimal | minimal | absent | absent | absent | absent | none |
| Spont. Ch | reactive | none | none | none | none | none | none |
| Periodic Ch | none | none | late decels | late decels | late decels | late decels | none |
| Var. Ch | none | none | none | none | none | none | none |

TABLE 16

Table 16. Time Lapse of Values for Maternal VTach

| Parameter | 30 s | 1 min | 2 min | 3 min | 4 min | 5 min | 6 min | 7 min |
|---|---|---|---|---|---|---|---|---|
| RR | 20 | 19 | 18 | 20 | 21 | 21 | 21 | 21 |
| Osat | 96 | 96 | 95 | 95 | 95 | 95 | 95 | 95 |
| EtCO2 | 29 | 30 | 33 | 32 | 31 | 32 | 30 | 30 |
| Car. Rhy. | Vtach | Vtach | Vtach | Vtach | Vtach | Vtach | Vtach | Vtach |
| HR | 120 | 120 | 120 | 120 | 120 | 120 | 120 | 120 |
| BP | 59/45 | 61/45 | 70/52 | 62/46 | 61/45 | 68/51 | 60/45 | 60/45 |
| Temp | 37 | 37 | 37 | 37 | 37 | 37 | 37 | 37 |
| Baseline | 135 | 135 | 135 | 135 | 135 | 135 | 135 | 135 |
| Var | mod | mod | mod | mod | mod | mod | minimal | mod |
| Spont. Ch | reactive | reactive | reactive | reactive | reactive | reactive | reactive | reactive |
| Periodic Ch | none | none | none | none | none | none | none | none |
| Var. Ch | none | none | none | none | none | none | none | none |

| Parameter | 8 min | 9 min | 10 min | 11 min | 15 min | 20 min | 25 min |
|---|---|---|---|---|---|---|---|
| RR | 20 | 21 | 20 | 21 | 21 | 20 | 20 |
| Osat | 94 | 94 | 95 | 94 | 95 | 94 | 95 |
| EtCO2 | 32 | 30 | 32 | 31 | 31 | 32 | 32 |
| Car. Rhy. | Vtach | Vtach | Vtach | Vtach | Vtach | Vtach | Vtach |
| HR | 120 | 120 | 120 | 120 | 120 | 120 | 120 |
| BP | 68/51 | 61/45 | 68/51 | 63/47 | 60/45 | 64/48 | 68/51 |
| Temp | 37 | 37 | 37 | 37 | 37 | 37 | 37 |
| Baseline | 135 | 135 | 135 | 131 | 125 | 120 | 120 |
| Var | minimal | minimal | minimal | minimal | minimal | minimal | minimal |
| Spont. Ch | reactive | reactive | reactive | reactive | reactive | non reactive | non reactive |
| Periodic Ch | none | none | none | none | none | none | none |
| Var. Ch | none | none | none | none | none | none | none |

Table 17 below describes the variations in the vital signs of the fetal model associated with fetal bleeding. The rate of bleeding can be varied to simulate different levels of trauma. In that regard, Table 18 below provides the corresponding values for the vital signs of the maternal and fetal models for a low rate of bleeding, while Table 19 below provides the corresponding values for a high rate of bleeding.

TABLE 17

Table 17. Variations in Values for Fetal Bleeding
Fetal Model Properties

| Baseline HR | Immediate decrease -> 0 (Low rate at 8 min, High rate at 3 min) |
|---|---|
| Variability | (Minimal) -> sinusoidal |
| Episodic Ch. | (Reactive) -> none |
| Periodic Ch. | None |
| Variables | None (no cord compression) |

TABLE 18

Table 18. Time Lapse of Values for Fetal Bleeding (Low Rate)

| Parameter | 30 s | 1 min | 2 min | 3 min | 4 min | 5 min | 6 min | 7 min | 8 min | 8 min 4 s |
|---|---|---|---|---|---|---|---|---|---|---|
| Baseline | 120 | 131 | 135 | 135 | 140 | 135 | 120 | 80 | 60 | 0 |
| Var | | sinusoidal | | | | | | | | |
| Spont. Ch | | none | | | | | | | | |
| Periodic Ch | | none | | | | | | | | |
| Var. Ch | | none | | | | | | | | |

TABLE 19

Table 19. Time Lapse of Values for Fetal Bleeding (High Rate)

| Parameter | 30 s | 1 min | 1 min 30 s | 2 min | 2 min 30 s | 3 min | 3 min 10 s |
|---|---|---|---|---|---|---|---|
| Baseline | 120 | 115 | 85 | 75 | 65 | 0 | |
| Var | sinusoidal | | | | | | |
| Spont. Ch | subtle | | | | | | |
| Periodic Ch | none | | | | | | |
| Var. Ch | none | | | | | | |

At the end of a delivery or labor scenario, the parameters of the fetal model are transferred to the neonatal model. In some instances, the fetal model and the neonatal model are controlled by the same controller or processor and, therefore, the transfer of parameters is performed by the controller. In other instances, the fetal model and the neonatal model are controlled by separate controllers or processors such that the parameters of the fetal model must be communicated to the controller or processor for the neonatal model. Generally, the communication of the parameters may occur over any suitable communication protocol including both wired and wireless connections. In some instances, the parameters are communicated utilizing TCP/IP communication. In this manner, the final fetal parameters are the initial parameters of the neonate model. Additionally, in some instances the term (i.e., gestational age) of the fetus determines the lung maturity of the neonate. Accordingly, the respiratory model of the neonatal model is adjusted to match the development of the fetus. Further, the fetal central nervous system model's final oxygen level at least partially determines the neural activity of the neonatal model in some instances. These and other parameters of the fetal model affect the resulting characteristics of the neonatal model. In turn, the characteristics of the neonatal model directly affect how the neonatal simulator responds to resuscitation efforts in post-birth simulations (e.g., the rate at which the neonatal simulator responds to various resuscitation techniques).

As noted above, the relationship(s) between the various models and/or compartments within the models are based on concurrent differential equations in some embodiments. Below specific examples of equations used to define the physiological relationships of the present disclosure. It is understood that these equations are exemplary in nature and in no way limit the specific relationships and/or equations that can be utilized in the context of the physiological models the present disclosure.

With respect to the circulatory models, in some instances the following relationships are utilized:

$$\text{Pressure} = (\text{Volume} - \text{Unstressed Volume}) * \text{Elastance}$$

$$\text{Flow Rate} = (\text{Pressure}_{upflow} - \text{Pressure}_{downflow})/\text{Resistance}$$

With respect to the respiratory models, in some instances the following relationships are utilized for inspiration aspects of the respiratory models:

Normal/Asthma:

$$R = P_{max} \# \frac{\left(-\frac{1}{3} - \frac{t_{Insp}}{2} + \frac{t_{Insp}}{(1-e^{-3t_{Insp}})}\right)}{V_{tidal}}$$

$$P_{pleural} = -P_{max} \# \frac{1 - e^{-3t_{respiration}}}{1 - e^{-3t_{Insp}}} - P_{min}$$

$$P_{transpulmonary} = -P_{max} \# \frac{t_{respiration}}{t_{Insp}} - P_{min}$$

$$P_{Alveolar} = P_{pleural} - P_{transpulmonary}$$

$$f_{air} = -P_{Alveolar} / R$$

Emphysema:

$$P_{pleural} = -P_{max} \# \frac{1 - e^{-3t_{respiration}}}{1 - e^{-3t_{Insp}}} - P_{min}$$

$$P_{pleural} = -P_{max} \# \frac{1 - e^{-3t_{respiration}}}{1 - e^{-3t_{Insp}}} - P_{min}$$

$$P_{transpulmonary} = -P_{max} \# \frac{1 - e^{-t_{respiration}}}{1 - e^{-t_{Insp}}} - P_{min}$$

$$P_{Alveolar} = P_{pleural} - P_{transpulmonary}$$

$$f_{air} = -P_{Alveolar} / R$$

Fibrosis:

$$R = P_{max} \# \frac{\left(-\frac{4}{3} - \frac{t_{Insp}}{(1-e^{t_{Insp}})} + \frac{t_{Insp}}{(1-e^{-3t_{Insp}})}\right)}{V_{tidal}}$$

$$P_{pleural} = -P_{max} \# \frac{1 - e^{-3t_{respiration}}}{1 - e^{-3t_{Insp}}} - P_{min}$$

$$P_{transpulmonary} = -P_{max} \# \frac{1 - e^{t_{respiration}}}{1 - e^{t_{Insp}}} - P_{min}$$

$$P_{Alveolar} = P_{pleural} - P_{transpulmonary}$$

$$f_{air} = -P_{Alveolar} / R$$

With respect to the respiratory models, in some instances the following relationships are utilized for expiration aspects of the respiratory models:

Normal:

$$R = P_{max} \# \frac{\left(-\frac{4}{3} - \frac{t_{Exp}}{(1-e^{t_{Exp}})} + \frac{t_{Exp}}{(1-e^{-3t_{Exp}})}\right)}{V_{tidal}}$$

$$P_{pleural} = P_{max} \# \frac{1 - e^{-3t_{respiration}}}{1 - e^{-3t_{Exp}}} - P_{min} - P_{max}$$

$$P_{transpulmonary} = P_{max} \# \frac{1 - e^{t_{respiration}}}{1 - e^{t_{Exp}}} - P_{min} - P_{max}$$

$$P_{Alveolar} = P_{pleural} - P_{transpulmonary}$$

$$f_{air} = -P_{Alveolar} / R$$

Emphysema:

$$P_{pleural} = -P_{max} \# \frac{1 - e^{-3t_{respiration}}}{1 - e^{-3t_{Exp}}} - P_{min}$$

$$P_{transpulmonary} = -P_{max} \# \frac{1 - e^{-t_{respiration}}}{1 - e^{-t_{Exp}}} - P_{min}$$

$$P_{Alveolar} = P_{pleural} - P_{transpulmonary}$$

$$f_{air} = -P_{Alveolar} / R$$

In the above equations related to the respiratory models, R=Resistance; $P_{max}$=Max Plueral Pressure; $t_{Insp}$=Inspiration Time; $V_{tidal}$=Intake Tidal Volume; $P_{pleural}$=Pleural Pressure; $P_{min}$=Min; $P_{transpulmonary}$=Transpulmonary Pressure; $P_{Alveolar}$=Alveolar Pressure; and $f_{air}$=air flow rate.

With respect to the gas exchanges utilized within the circulatory and respiratory models, in some instances the relationships discussed below are utilized. As a general matter, for the respiratory models the equations are based on dividing the airways into at least two segments, where one of the segments is dead space. Oxygen ($O_2$) and carbon dioxide ($CO_2$) are exchanged between the adjacent segments and then with the pulmonary capillaries (which are the right lung and left lung compartments of the circulatory model, in some instances). The fractions of oxygen and carbon dioxide are calculated and converted to partial pressures, such that the amount of gas exchanged with the capillaries is defined by the following general equation: $V_{exchange}$=a (Partial Pressure in Lungs−Partial Pressure in Capillaries), where "a" is a constant. In some instances, for exchanges at the Alveoli-capillary interface it is assumed that $Con_{O2cap}$=$Con_{O2alveoli}$ and $Con_{CO2cap}$=$Con_{CO2alveoli}$. That is, it is assumed that CO2 concentration in capillaries is equal to the O2 concentration in alveoli and, similarly, the CO2 concentration in capillaries is equal to the CO2 concentration in alveoli. Similar equations are utilized for gas exchanges at other locations.

For example, for gas exchanges at the placenta-uterus interface the following equations are utilized in some instances:

$$V_{gainO2}(\text{ml/sec})=0.00315*(P_{utO2}-P_{plaO2})$$

$$V_{lostCO2}(\text{ml/sec})=0.00255*(P_{plaCO2}-P_{utCO2})$$

In that regard, $P_{utO2}$=Uterus O2 Pressure; $P_{plaO2}$=Placenta O2 Pressure; $P_{utCO2}$=Uterus CO2 Pressure; and $P_{plaCO2}$=Placenta CO2 Pressure.

Figure 6:
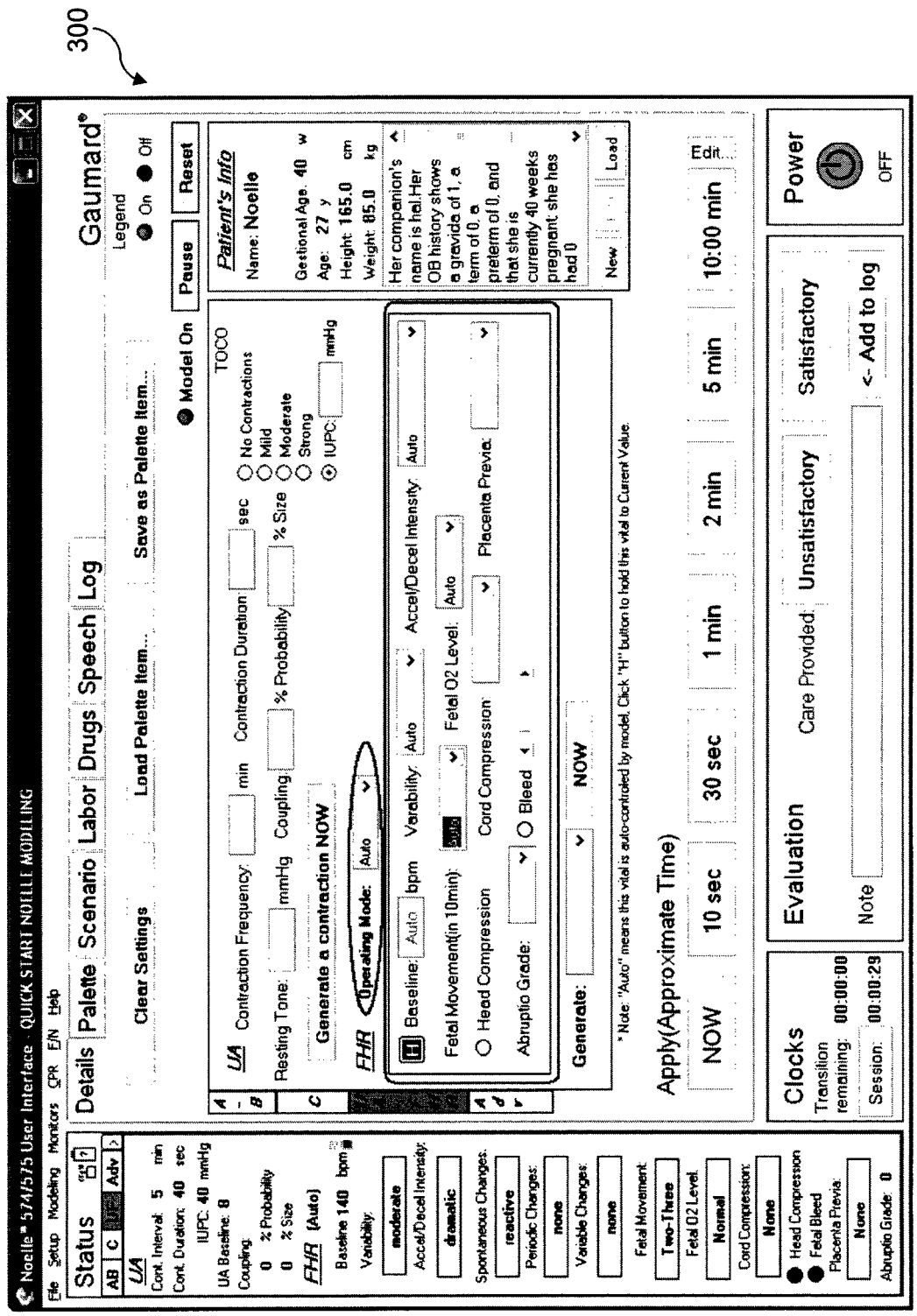
FIG. 6 is a screen shot of a user interface according to another aspect of the present disclosure.

Referring now to FIG. 6, shown therein is a screen shot of user interface 300 illustrating aspects of another embodiment of the present disclosure. In particular, the user interface 300 is an exemplary embodiment of a user interface that facilitates control of one or more of the physiological models described above. In that regard, the user interface 300 is shown as being suitable for controlling at least the maternal and fetal models 104, 106 of the pregnancy model 102 described above. As a general matter, the user interface 300 allows a user to control aspects of the physiological model(s) manually, if desired, or simply allow the models to run automatically. For example, the user can choose to operate FHR tracings in Manual, Auto or Birth mode. In that regard, Birth mode is understood to represent a particular birthing scenario selected or created by the user. Further, the user has the freedom to have parameters like "Baseline", "Varability", "Accel/Decel Intensity", "Fetal Movement", "Fetal O2 Level", and/or other parameters of the models to be automatically controlled by the model or manually controlled by the user.

As a general matter, when in manual mode the user is able to select or define the values for the various parameters. For example, in some instances the user selects a particular value from a drop down menu, selection of buttons, or other visual display. Examples of such available selections include but are not limited to: Fetal Movement: Auto, None, 0-1, 2-3, 4-5, >5; Fetal O2 Level: Auto, Normal, Poor, Very Poor; Cord Compression: none, slight, severe; Placenta Previa None, Marginal, Partial, Total; and Abruptio Grade: 0, 1, 2, 3. In some instances, the user defines a particular value by inputting a numerical value or other parameter defining term into an input field. It is understood that a user will have some parameters running in auto mode while others are in manual mode in some instances. In other instances, the user will have the models running in either full auto mode or full manual mode.

Although illustrative embodiments have been shown and described, a wide range of modification, change, and substitution is contemplated in the foregoing disclosure and in some instances, some features of the present disclosure may be employed without a corresponding use of the other features. It is understood that such variations may be made in the foregoing without departing from the scope of the embodiment. Accordingly, it is appropriate that the appended claims be construed broadly and in a manner consistent with the scope of the present disclosure.

What is claimed is:

1. A system for teaching patient care, the system comprising:
    a maternal simulator comprising a maternal manikin, a maternal circulatory model, a maternal cardiac ischemia model, and a maternal respiratory model;
    a fetal simulator comprising a fetal manikin positioned within the maternal simulator, the fetal simulator comprising a fetal circulatory model, a fetal cardiac ischemia model, and a fetal central nervous system model; and
    a controller in communication with the maternal simulator and the fetal simulator, the controller automatically coordinating parameters of the maternal circulatory model, the maternal cardiac ischemia model, the maternal respiratory model, the fetal circulatory model, the fetal cardiac ischemia model, and the fetal central nervous system model to simulate physiological characteristics of a natural interaction between a mother and a fetus,
    wherein the controller automatically coordinates a simulated physiological exchange between the fetal central nervous system model and the fetal circulatory model such that one or more characteristics of the fetal circulatory model are based on one or more characteristics of the fetal central nervous system model, the one or more characteristics of the fetal circulatory model including at least one of: a fetal heart rate or a fetal blood oxygen level.

2. The system of claim 1, wherein the maternal circulatory model is a multi-compartment circulatory model including a simulated uterus.

3. The system of claim 2, wherein the maternal circulatory model further includes: a simulated right atrium, a simulated right ventricle, a simulated left atrium, and a simulated left ventricle.

4. The system of claim 1, wherein the maternal ischemia model includes a simulated aorta and a simulated coronary artery.

5. The system of claim 1, wherein the maternal respiratory model includes a simulated right lung and a simulated left lung.

6. The system of claim 1, wherein fetal circulatory model is a multi-compartment circulatory model including a simulated placenta.

7. The system of claim 6, wherein the fetal circulatory model further includes at least: a simulated right atrium, a simulated right ventricle, a simulated left atrium, and a simulated left ventricle.

8. The system of claim 1, wherein the fetal ischemia model includes a simulated aorta and a simulated coronary artery.

9. The system of claim 1, wherein the maternal circulatory model and the fetal circulatory model are connected to one another; and wherein the controller automatically coordinates a simulated physiological exchange between the fetal circulatory model and the maternal circulatory model representative of a natural interaction between the mother and the fetus.

10. The system of claim 9, wherein the maternal circulatory model includes a simulated uterus and the fetal circulatory model includes a simulated placenta, the simulated placenta being connected to the simulated uterus; and wherein the controller automatically coordinates the simulated physiological exchange between the fetal circulatory model and the maternal circulatory model via the simulated placenta and the simulated uterus.

11. The system of claim 1, wherein the maternal simulator includes a mechanism configured to translate and rotate the fetal simulator relative to maternal simulator to simulate a birth.

12. The system of claim 1, wherein the controller includes a processor programmed to coordinate parameters of the maternal circulatory model, the maternal cardiac ischemia model, the maternal respiratory model, the fetal circulatory model, the fetal cardiac ischemia model, and the fetal central nervous system model based on a desired physiological scenario.

13. The system of claim 12, wherein the controller is positioned remote from the maternal simulator.

14. The system of claim 12, wherein the desired physiological scenario is selectable by a user through a user interface.

15. The system of claim 12, wherein the desired physiological scenario is selected from a group consisting of maternal bleeding, maternal uterine rupture, maternal apnea, maternal VFib, maternal VTach, fetal bleeding, and fetal cord compression.

16. The system of claim 1, wherein the maternal simulator further includes a maternal cardiac dipole model.

17. The system of claim 16, wherein the maternal cardiac dipole model generates 12-lead ECG waves for four heart chambers of the maternal circulatory model.

18. The system of claim 17, wherein the maternal cardiac dipole model further generates a contraction profile that includes timing and contractility of each of the four heart chambers during a contraction.

19. The system of claim 1, further comprising a neonatal simulator for use in post birth situations, the neonatal simulator including a neonatal circulatory model, a neonatal cardiac ischemia model, and a neonatal respiratory model.

20. The system of claim 19, wherein the controller is in communication with the neonatal simulator and configured to coordinate parameters of the neonatal circulatory model, the neonatal cardiac ischemia model, and the neonatal respiratory model to simulate physiological characteristics of a newborn.

21. The system of claim 20, wherein the parameters of the neonatal circulatory model and the neonatal cardiac ischemia model are at least partially based upon the parameters of the fetal circulatory model and the fetal cardiac ischemia model.

22. An apparatus comprising:
a patient simulator comprising:
a maternal patient body comprising one or more simulated body portions, the one or more simulated body portions including at least a simulated circulatory system and a simulated respiratory system; and
a fetal patient body for use with the maternal patient body to simulate a birthing scenario, the fetal patient body comprising one or more simulated body portions, the one or more simulated body portions including at least a simulated circulatory system;
a controller in communication with the patient simulator, the controller configured to coordinate parameters of the simulated circulatory system and the simulated respiratory system of the maternal patient body and the simulated circulatory system of the fetal patient body to simulate natural physiological interactions between a mother and a fetus based on a desired physiological scenario, the controller determining the parameters of the simulated circulatory system and the simulated respiratory system of the maternal patient body and the simulated circulatory system of the fetal patient body for the desired physiological scenario based on a circulatory model and a respiratory model for the maternal patient body, a circulatory model for the fetal patient body, and a user's interaction with at least one of the maternal patient body and the fetal patient body, wherein one or more characteristics of the circulatory model for the fetal patient body are based on one or more characteristics of a central nervous system model for the fetal patient body.

23. The apparatus of claim 22, wherein the circulatory model is a multi-compartment circulatory model including at least a simulated right atrium, a simulated right ventricle, a simulated left atrium, and a simulated left ventricle.

24. The apparatus of claim 22, wherein the circulatory model for the maternal patient body includes a simulated uterus and the circulatory model for the fetal patient body includes a simulated placenta such that the circulatory models of the maternal patient body and the fetal patient body are connected via the simulated placenta and the simulated uterus; and wherein the controller automatically coordinates a simulated physiological exchange between the circulatory model for the fetal patient body and the circulatory model for the maternal patient body via the simulated placenta and the simulated uterus.

25. The apparatus of claim 22, wherein the respiratory model includes at least a simulated right lung and a simulated left lung.

26. The apparatus of claim 22, wherein the controller determines the parameters of the simulated circulatory system of the maternal patient body for the desired physiological scenario at least partially based on a maternal ischemia model, the ischemia model including a simulated aorta and a simulated coronary artery.

27. The apparatus of claim 22, wherein the fetal patient body is sized and shaped to simulate a newborn.

28. The apparatus of claim 22, wherein the controller automatically coordinates a simulated physiological exchange between the central nervous system model for the fetal patient body and the circulatory model for the fetal patient body that causes the one or more characteristics of the circulatory model for the fetal patient body to be based on the one or more characteristics of the central nervous system model for the fetal patient body.

29. The apparatus of claim 28, wherein the fetal patient body simulates a fetus when positioned within the maternal patient body and simulates a newborn when positioned outside the maternal patient body after the birthing simulation.

30. The apparatus of claim 22, wherein the patient simulator is configured to generate 12-lead ECG waves and contraction profiles for a heart of the simulated circulatory system, wherein the controller controls the 12-lead ECG waves and contraction profiles generated by the patient simulator.

31. The apparatus of claim 30, wherein the controller determines values for the 12-lead ECG waves and the contraction profiles based on a cardiac dipole model.

32. A method of teaching patient care, comprising:
providing a maternal simulator comprising a simulated maternal patient body having a simulated maternal circulatory system and a simulated maternal respiratory system;

providing a fetal simulator for use with the maternal simulator, the fetal simulator comprising a simulated fetal patient body having a simulated fetal circulatory system;

controlling one or more parameters of the simulated maternal circulatory system and the simulated maternal respiratory system based on a maternal circulatory model and a maternal respiratory model; and controlling one or more parameters of the simulated fetal circulatory system based on a fetal circulatory model and a fetal central nervous system model, wherein the controlling of the one or more parameters of the simulated fetal circulatory system includes simulating a physiological exchange between the fetal circulatory model and the fetal central nervous system model that causes one or more characteristics of the fetal circulatory model to be based on one or more characteristics of the fetal central nervous system model;

wherein the parameters of the simulated maternal circulatory system, the simulated maternal respiratory system, and the simulated fetal circulatory system are automatically coordinated to simulate physiological interactions between a natural mother and a fetus for a desired physiological scenario based on at least the maternal circulatory model, the maternal respiratory model, the fetal circulatory model, and a user's interaction with at least one of the maternal patient body and the fetal patient body.

33. The method of claim 32, wherein controlling the one or more parameters of the simulated maternal circulatory system is further based on a maternal cardiac dipole model.

34. The method of claim 32, wherein the one or more controlled parameters of the simulated maternal circulatory system includes one or more of a maternal blood pressure, a maternal heart rate, and a maternal cardiac rhythm.

35. The method of claim 32, wherein the one or more controlled parameters of the simulated fetal circulatory system includes a fetal heart rate.

36. The method of claim 32, wherein the maternal circulatory model includes a simulated uterus and the fetal circulatory model includes a simulated placenta, the fetal circulatory model and the maternal circulatory model being connected via the simulated placenta and the simulated uterus.

37. The method of claim 36, wherein the fetal circulatory model and the maternal circulatory model include a simulated physiological exchange occurring between the simulated placenta and the simulated uterus.

38. The system of claim 1, wherein the simulated physiological exchange between the fetal central nervous system model and the fetal circulatory model comprises a first transfer simulating the sending of oxygen rich blood from a fetal circulatory system to a fetal central nervous system, and a second transfer simulating the sending of blood with an increased amount of carbon dioxide from the fetal central nervous system back into the fetal circulatory system.

* * * * *